US009607473B2

(12) United States Patent
Arezina et al.

(10) Patent No.: US 9,607,473 B2
(45) Date of Patent: Mar. 28, 2017

(54) WAGERING GAME SYSTEM WITH PLAYER REWARDS

(71) Applicant: Bally Gaming, Inc., Las Vegas, NV (US)

(72) Inventors: Vladimir I. Arezina, River Forest, IL (US); Michael J. Blankstein, Evanston, IL (US); Rory L. Block, Carson City, NV (US); Allon G. Englman, Chicago, IL (US); McLaurin H. Files, Chicago, IL (US); Mark B. Gagner, West Chicago, IL (US); Brian R. Gamache, Lake Forest, IL (US); Jeremy M. Hornik, Chicago, IL (US); Joel R. Jaffe, Glenview, IL (US); Larry J. Pacey, Chicago, IL (US); Shridhar P. Joshi, Naperville, IL (US); Alfred Thomas, Las Vegas, NV (US); Jamie W. Vann, Chicago, IL (US); Matthew J. Ward, Northbrook, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 15/096,963

(22) Filed: Apr. 12, 2016

(65) Prior Publication Data

US 2016/0225233 A1 Aug. 4, 2016

Related U.S. Application Data

(63) Continuation of application No. 14/263,683, filed on Apr. 28, 2014, now Pat. No. 9,336,652, which is a
(Continued)

(51) Int. Cl.
*A63F 13/00* (2014.01)
*G07F 17/32* (2006.01)

(52) U.S. Cl.
CPC .......... *G07F 17/3258* (2013.01); *G07F 17/32* (2013.01); *G07F 17/323* (2013.01);
(Continued)

(58) Field of Classification Search
None
See application file for complete search history.

(56) References Cited

U.S. PATENT DOCUMENTS

| | | | |
|---|---|---|---|
| 6,604,740 | B1 | 8/2003 | Singer et al. |
| 6,869,362 | B2 | 3/2005 | Walker et al. |

(Continued)

FOREIGN PATENT DOCUMENTS

| | | |
|---|---|---|
| JP | 2003-190578 | 7/2003 |

OTHER PUBLICATIONS

PCT International Search Report for International Application No. PCT/US2007/010651 dated Sep. 17, 2008 (6 pages).

(Continued)

*Primary Examiner* — Jason Yen
(74) *Attorney, Agent, or Firm* — Nixon Peabody LLP

(57) ABSTRACT

A gaming system includes one or more processors and one or more memory devices storing instructions that, when executed by at least one of the one or more processors, cause the gaming system to perform a plurality of operations. The operations include awarding a plurality of points to a player, and, in response to a predetermined number of the points being redeemed by the player, accessing or modifying wagering game content.

20 Claims, 24 Drawing Sheets

Related U.S. Application Data continuation of application No. 13/606,674, filed on Sep. 7, 2012, now Pat. No. 8,771,082, which is a continuation of application No. 12/299,220, filed as application No. PCT/US2007/010651 on May 2, 2007, now Pat. No. 8,282,489.

(60) Provisional application No. 60/843,635, filed on Sep. 11, 2006, provisional application No. 60/797,166, filed on May 3, 2006.

(52) U.S. Cl.
CPC ...... *G07F 17/3244* (2013.01); *G07F 17/3255* (2013.01); *G07F 17/3227* (2013.01); *G07F 17/3267* (2013.01)

(56) References Cited

U.S. PATENT DOCUMENTS

| | | | | |
|---|---|---|---|---|
| 7,025,674 | B2 | 4/2006 | Adams et al. | |
| 7,291,068 | B2 | 11/2007 | Bryant et al. | |
| 7,303,475 | B2 | 12/2007 | Britt et al. | |
| 7,922,578 | B2 | 4/2011 | Okuniewicz | |
| 8,029,364 | B2 | 10/2011 | Loose et al. | |
| 2001/0034259 | A1 | 10/2001 | Luciano et al. | |
| 2002/0016202 | A1 | 2/2002 | Fertitta, III et al. | |
| 2002/0065126 | A1 | 5/2002 | Miller et al. | |
| 2002/0065716 | A1 | 5/2002 | Kuschill | |
| 2002/0077173 | A1 | 6/2002 | Luciano et al. | |
| 2002/0132660 | A1* | 9/2002 | Taylor | G07F 17/32 463/16 |
| 2002/0193162 | A1* | 12/2002 | Walker | A63F 13/12 463/42 |
| 2003/0083943 | A1 | 5/2003 | Adams et al. | |
| 2003/0114220 | A1 | 6/2003 | McClintic | |
| 2003/0146574 | A1 | 8/2003 | Duhamel | |
| 2004/0048657 | A1 | 3/2004 | Gauselmann | |
| 2004/0229700 | A1 | 11/2004 | Cannon et al. | |
| 2004/0266510 | A1* | 12/2004 | Kojima | G07F 17/3211 463/16 |
| 2004/0266517 | A1* | 12/2004 | Bleich | G07F 17/3262 463/20 |
| 2006/0063580 | A1 | 3/2006 | Nguyen et al. | |
| 2006/0116194 | A1 | 6/2006 | Pacey et al. | |
| 2006/0189377 | A1* | 8/2006 | Gomez | G07F 17/3244 463/20 |
| 2007/0298856 | A1 | 12/2007 | Gilmore et al. | |
| 2008/0248865 | A1 | 10/2008 | Tedesco et al. | |
| 2011/0275438 | A9 | 11/2011 | Hardy et al. | |

OTHER PUBLICATIONS

PCT International Written Opinion for International Application No. PCT/US2007/010651 dated Sep. 17, 2008 (6 pages).

* cited by examiner

14

10

14

WAGERING GAME SYSTEM WITH PLAYER REWARDS

CROSS REFERENCE TO RELATED APPLICATIONS

This application is a continuation of U.S. patent application Ser. No. 14/263,683, filed Apr. 28, 2014, and titled "Wagering Game System With Player Awards For Modifying Game Contents," now allowed, which is a continuation of U.S. patent application Ser. No. 13/606,674, filed on Sep. 7, 2012, and titled "Wagering Game System With Player Rewards," now issued as U.S. Pat. No. 8,771,082, which is a continuation of U.S. patent application Ser. No. 12/299,220, filed on Oct. 31, 2008, and titled "Wagering Game System With Player Rewards," now issued as U.S. Pat. No. 8,282,489, which is a U.S. national stage of International Application No. PCT/US2007/010651, filed on May 2, 2007, and titled "Wagering Game System With Player Rewards," which is related to and claims priority to U.S. Provisional Application No. 60/843,635, filed on Sep. 11, 2006, and titled "Wagering Game System With Player Rewards," and U.S. Provisional Application No. 60/797,166, filed on May 3, 2006, and titled Wagering Game System With Player Rewards," each of which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having rewards and incentives for players that are members of a certain club or group.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

Some casinos use loyalty programs, also known as "casino comps," to increase and retain the number of their customers by offering "comps" (e.g., complimentary items and services). The purpose for using casino comps is to get the player to come back to the casino by promoting good will and by enticing player loyalty to the player rewards system. Comps can range from free items, such as hats and pens, to free services, such as valet parking and hotel stays. The casino comps programs are generally funded by a percentage of the player's wagers. To participate in a casino comps program, the player signs up for a player rewards card and uses it when using a gaming machine. Based on the amount of gameplay, the player accumulates a certain number of casino points. The accumulated casino points can be redeemed for specific comps.

Current casino comps programs fail to provide adequate results. For example, one problem associated with some current casino comps programs is that they are limited to awarding comps based only on the amount of gameplay. Another problem of some current casino comps programs is that they are funded only by the players.

Thus, a need exists for a player rewards system that overcomes one or more of these problems.

SUMMARY OF THE INVENTION

According to one aspect of the present invention, a gaming system includes one or more processors and one or more memory devices storing instructions that, when executed by at least one of the one or more processors, cause the gaming system to perform a plurality of operations. The operations include awarding a plurality of points to a player, and, in response to a predetermined number of the points being redeemed by the player, accessing or modifying wagering game content.

According to another aspect of the present invention, a gaming system includes one or more processors and one or more memory devices storing instructions that, when executed by at least one of the one or more processors, cause the gaming system to perform the operation of, in response to receiving an indication that a player is a member of a player club, accessing a wagering game or segment thereof that is currently unavailable to players who are not members in the player club.

According to another aspect of the present invention, a computer-implemented method is directed to conducting wagering games on a wagering game system, the wagering game system including one or more wager input devices, one or more display devices, and one or more processors. The method includes receiving, via at least one of the one or more input devices, a wager to initiate a wagering game on the wagering game system, and randomly selecting, via at least one of the one or more processors, a game outcome from a plurality of game outcomes. The method further includes awarding, via at least one of the one or more processors, a plurality of points to a player, and, in response to a predetermined number of the points being redeemed by the player, accessing or modifying, via at least one of the one or more processors, wagering game content.

According to another aspect of the present invention, a computer-implemented method is directed to conducting wagering games on a wagering game system, the wagering game system including one or more wager input devices, one or more display devices, and one or more processors. The method includes receiving, via at least one of the one or more input devices, a wager to initiate a wagering game on the wagering game system, and randomly selecting, via at least one of the one or more processors, a game outcome from a plurality of game outcomes. The method further includes, in response to receiving an indication that a player is a member of a player club, accessing, via at least one of the one or more processors, a wagering game or segment thereof that is currently unavailable to players who are not members in the player club.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
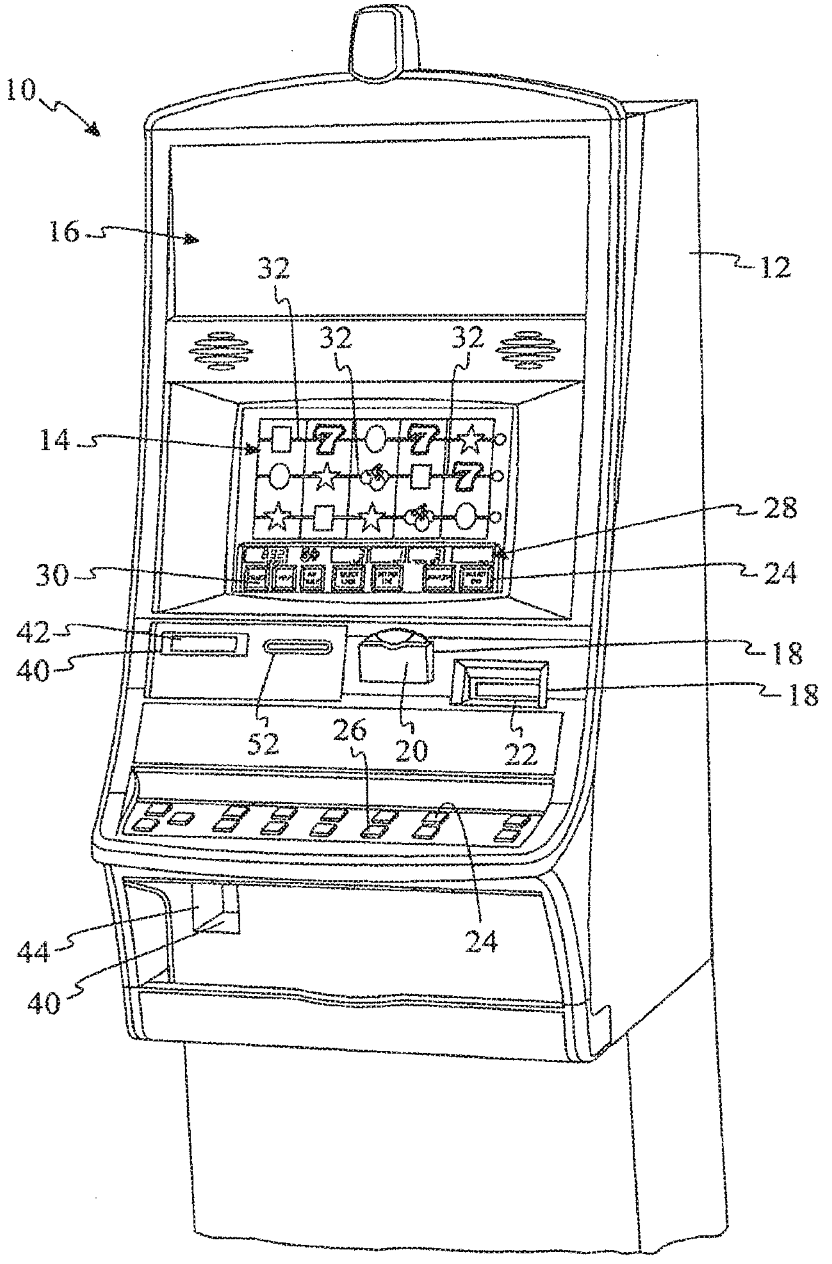
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
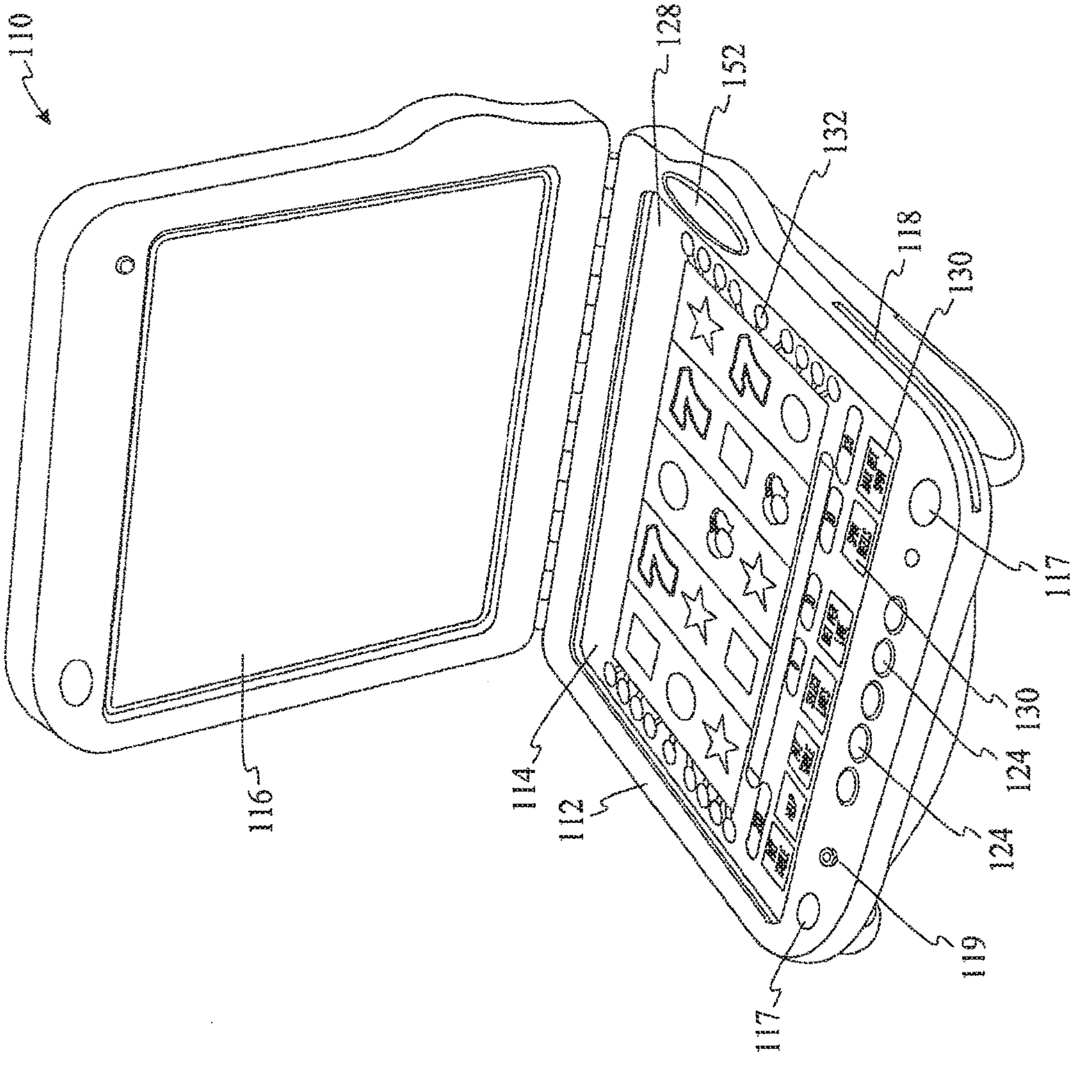
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2"-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
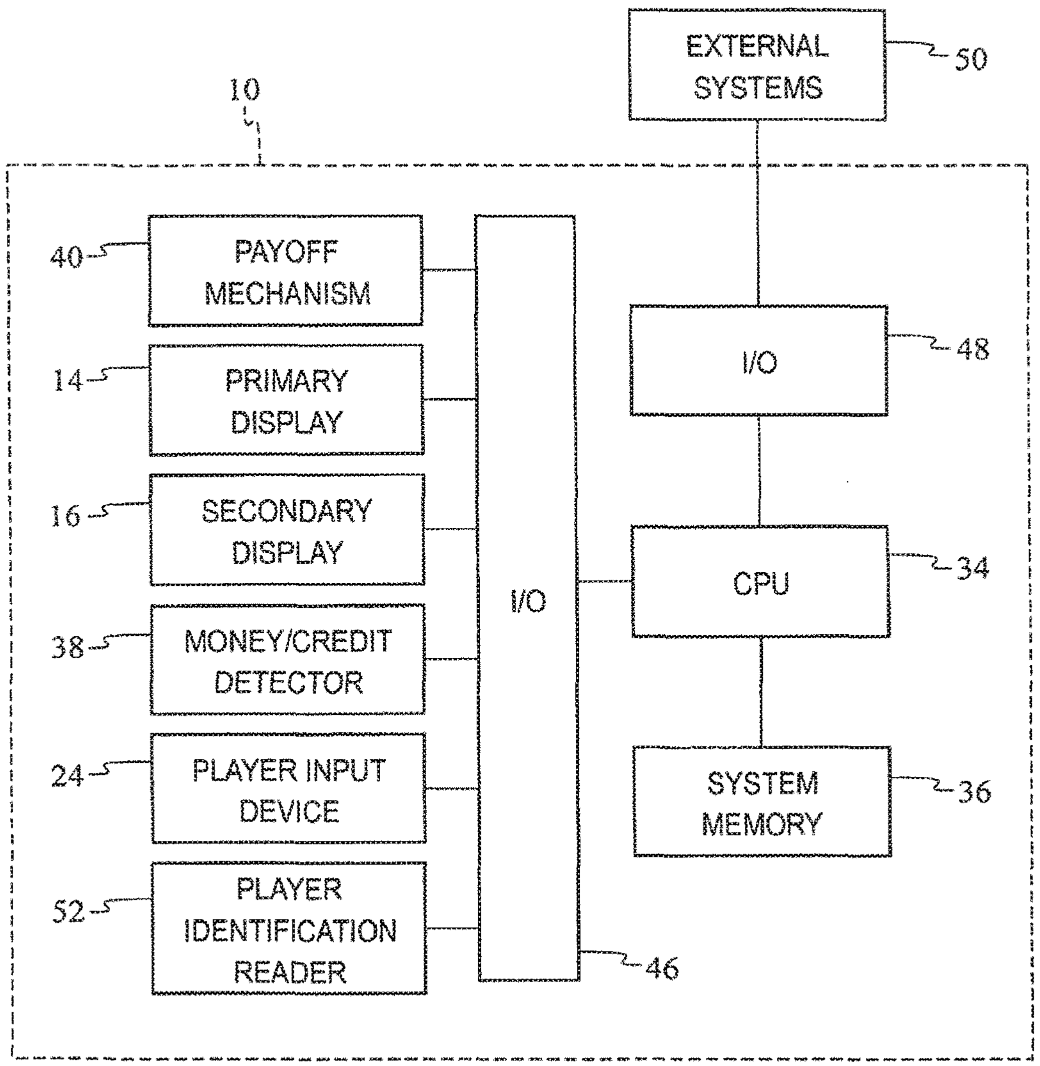
FIG. 2 is a block diagram of a control system suitable for operating the gaming machines of FIGS. 1*a* and 1*b*.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Referring to FIGS. 3-11, a gaming system has rewards and incentives for players that are members of a certain club or group. Thus, a player that is identified as a member of the certain group is offered player options related to the wagering game. The options are unavailable to players who are not members of the certain group. As described in more detail below, the player uses a card to identify himself or herself as a member of a certain group and to obtain certain options or rewards.

Figure 3:
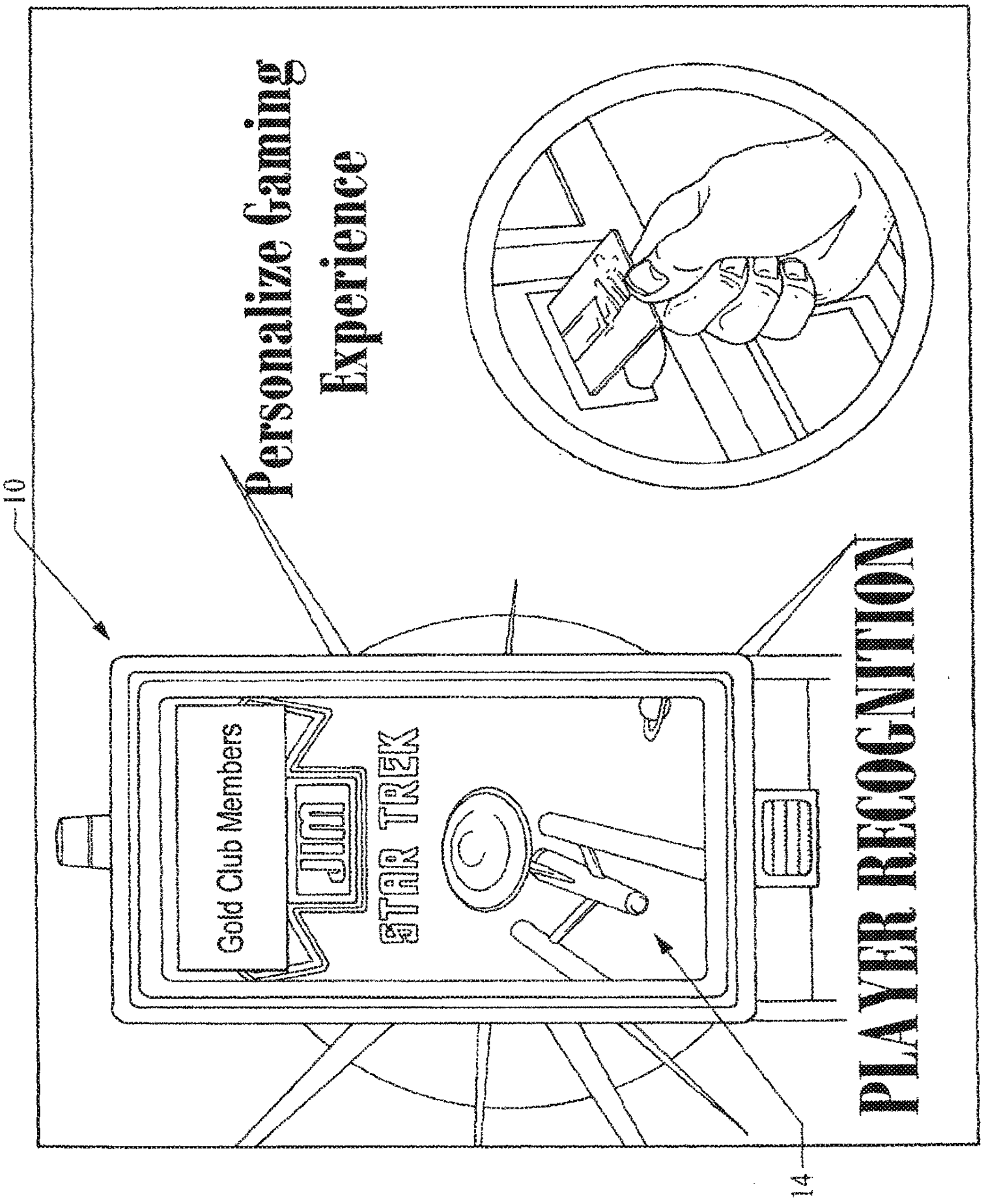
FIG. 3 is an illustration of a screen on the display of the gaming machine in which a club player is provided with options to personalize the wagering game, according to an embodiment of the current invention.

Turning now to FIG. 3, the primary display 14 provides information allowing the player to personalize features of the gaming machine 10 in response to the player inserting his or her card, which identifies the player as being a member of a certain club. Once the card has been inserted into the gaming machine 10, the gaming machine 10 provides information to an external system 50 (FIG. 2) to identify and/or confirm that the card is associated with the club that provides certain options or rewards to the player.

The personalized player preferences of FIG. 3 generally relate to the values of those parameters that players have selected in establishing their preferred configuration of the gaming machine 10. The player preferences may include the preferred game (game type), the preferred configuration of the gaming machine (language, sound options, speed of reel spins, number of pay lines played per play, number of credits wagered per pay line, reel symbols, theme, etc.), and the preferred distribution of awards (payout structure, payout options, form of complimentaries, currency). Accordingly, once the player has been determined to be affiliated with a certain club, the gaming machine 10 allows a player to provide input via the player input device 24 to alter (or update) and establish the player preferences on the gaming machine 10.

Figure 4:
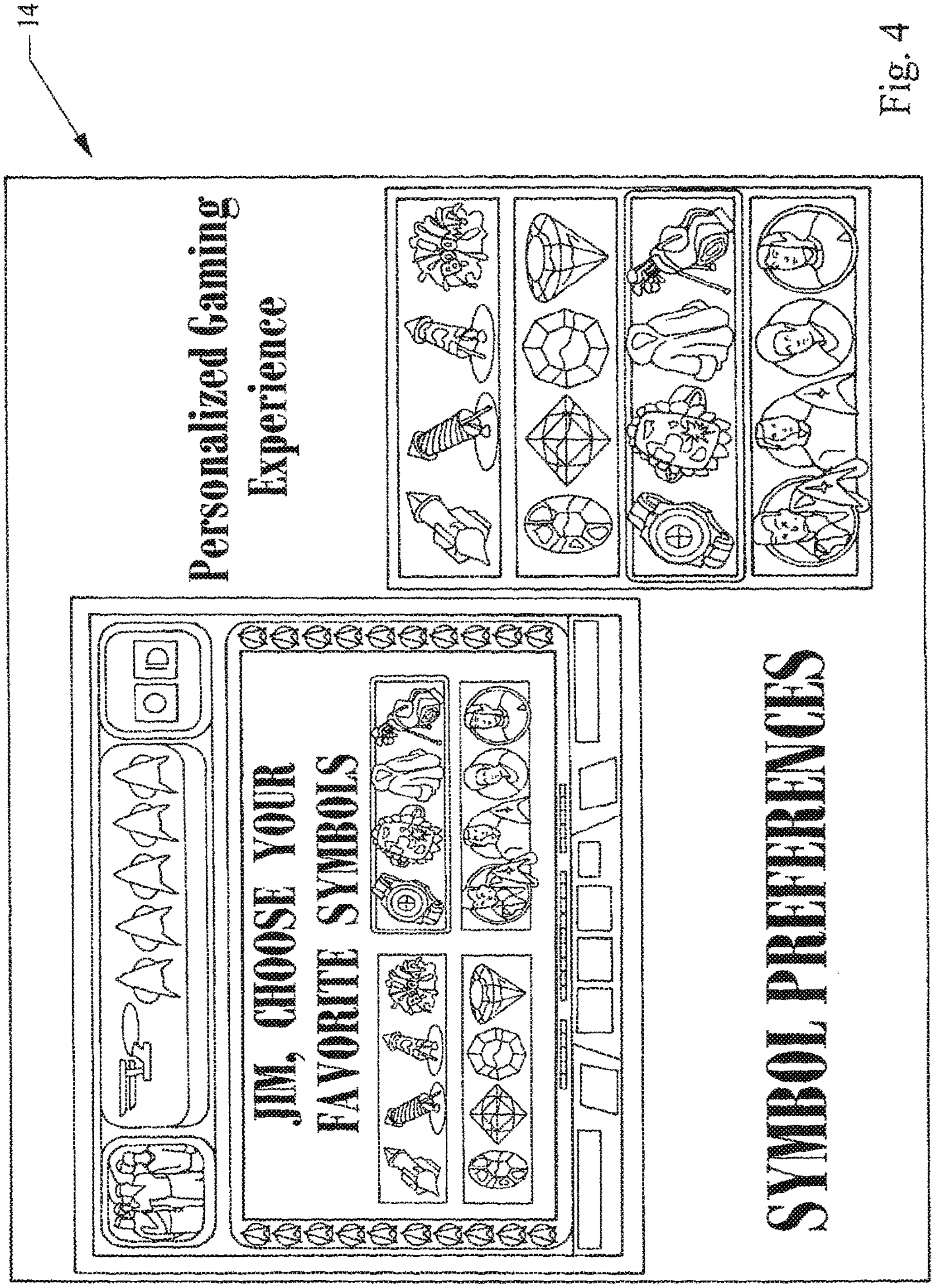
FIG. 4 is an illustration of a screen on the display of the gaming machine in which a club player is provided with options to customize symbols that indicate the game outcome, according to an alternative embodiment of the current invention.

FIG. 4 illustrates a screen shot on the display 14 in which a player is permitted to further personalize the wagering game at the gaming machine 10 in response to the player being a member of the players club. In this embodiment, the player can alter the symbols that are used to indicate the randomly selected outcome of the wagering game at the gaming machine 10. For example, instead of a "rocket" symbol being used within a symbol combination that indicates the highest payout, the player can change the symbols such that a certain jewel symbol (e.g., a "sapphire" symbol) is used for indicating a symbol combination associated with the highest payout. Alternatively, the player may choose to completely reverse symbols such that the most undesirable symbol now becomes the most desirable symbol. Accordingly, regardless of the theme of the wagering game, the player can alter the symbol structure associated with the wagering game.

In addition to common symbols, the player may be able to download certain symbols associated with himself or herself. For example, pictures of the player's family pet or a certain family member can be used as symbols. The external system 50 would store these images in association with the player and offer those symbols as an option to the player.

Figure 5:
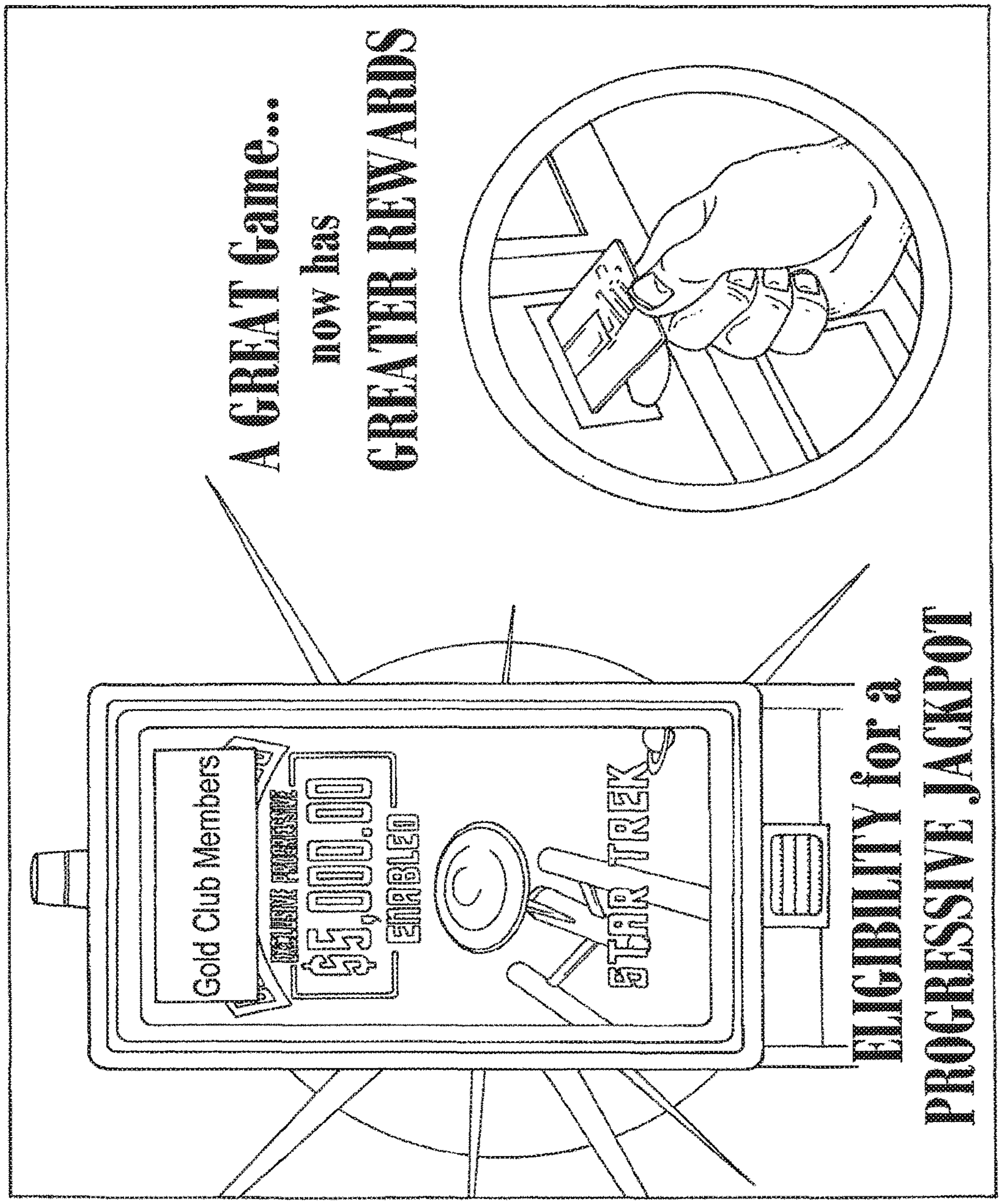
FIG. 5 is an illustration of a screen on the display of the gaming machine in which a club player is provided with an option of a local progressive game, according to another alternative embodiment of the current invention.

FIG. 5 illustrates the opportunity of the player to become eligible for a progressive jackpot if he or she is a member of the club. The progressive jackpot may be associated with only that particular gaming machine 10, a group of gaming machines in the gaming establishment, or a group of gaming machines across multiple establishments. If the player is a member of the club, the player has access to the progressive jackpot. If the player chooses this option, the highest paying symbol combination may become the progressive-award symbol combination (e.g., triple "7" symbols will yield the progressive award, as opposed to the highest predefined payout as set forth on the pay table of the gaming machine 10).

As a further precondition to being eligible for the progressive jackpot, the player may be required to make an additional wager. Each wager is then used to increase (i.e., fund) the progressive jackpot from its base level to an increased jackpot level. Every player who identifies himself or herself as a member of the club that plays a gaming machine 10 then has access to this increasing progressive jackpot, which is awarded in response to one of the players achieving the highest paying symbol combination.

Figure 6:
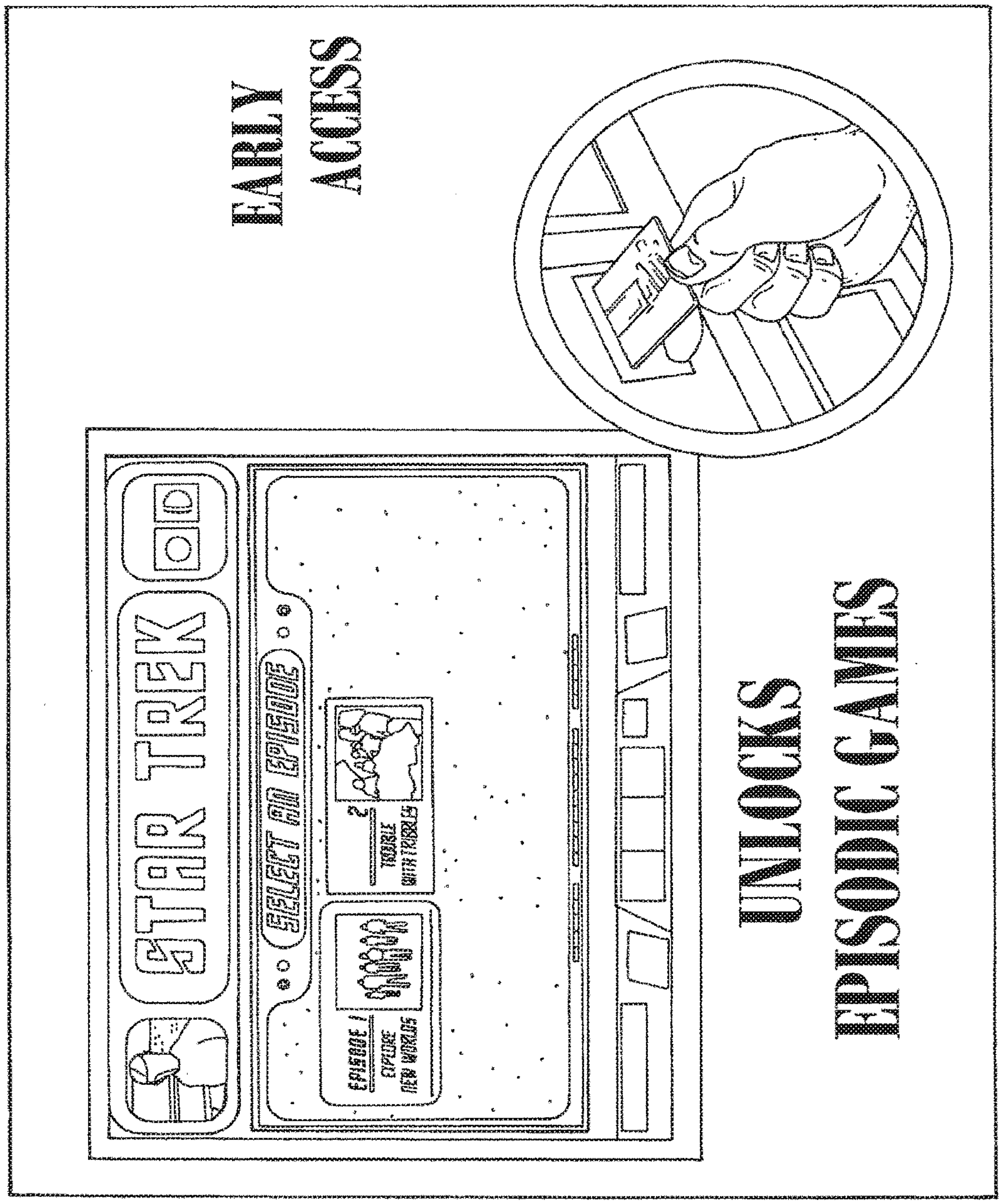
FIG. 6 is an illustration of a screen on the display of the gaming machine in which a club player is provided with an option for early access to game content or features, according to another alternative embodiment of the current invention.

FIG. 6 illustrates a player who is a member of the club obtaining early access to a certain feature of the wagering game. For example, some wagering games have an episodic nature in that the player may progress through certain episodes or stages to achieve an enhanced gaming experience or, possibly, additional or enhanced payouts. Those episodes may be available to the player after the player has achieved certain predetermined criteria. Accordingly, if the player is a member of the club, the criteria required to achieve the next episode may be removed such that the player can more easily access the next episode. Alternatively, certain episodes may be exclusively available to players who are members of the club.

Figure 7:
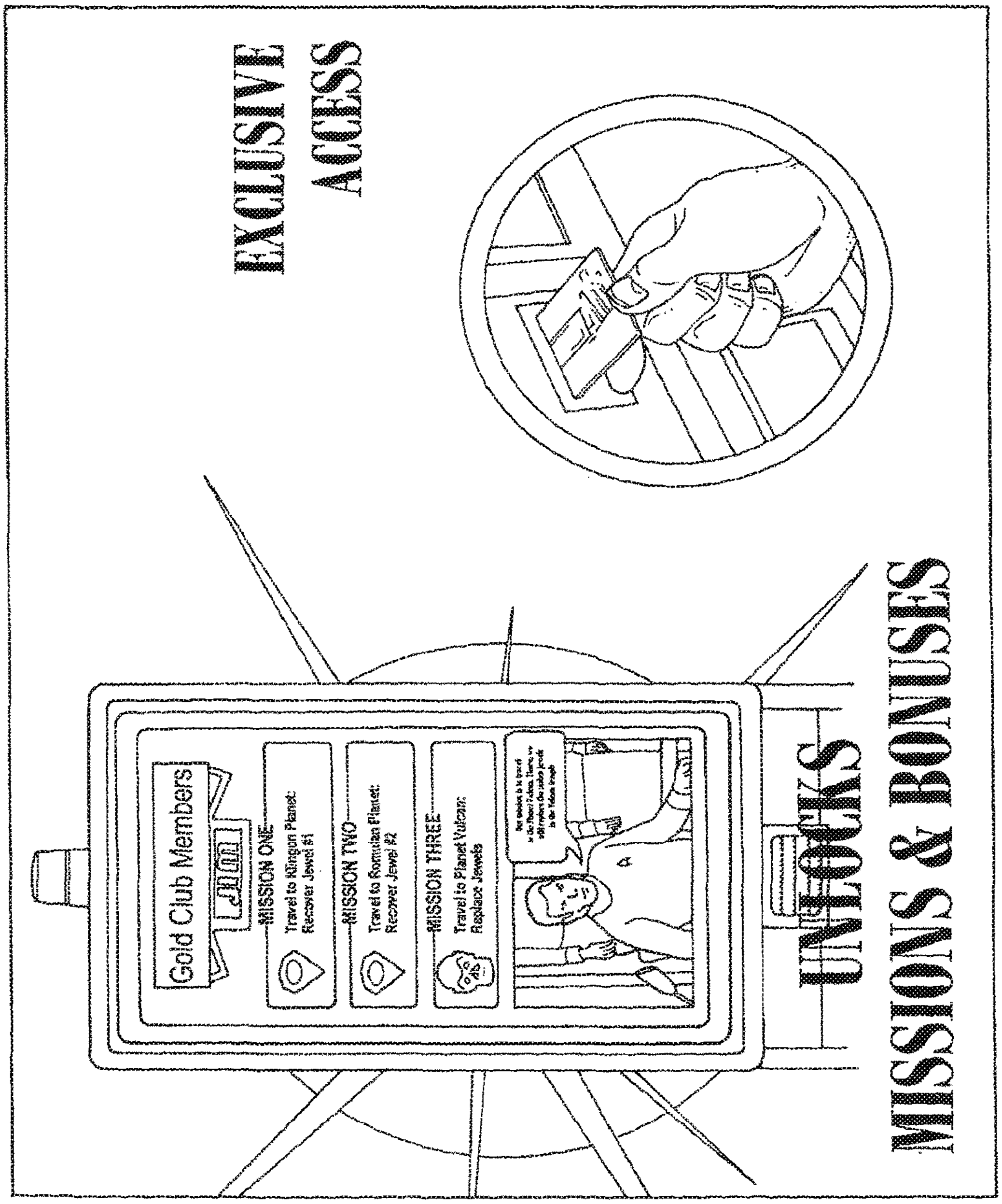
FIG. 7 is an illustration of a screen on the display of the gaming machine in which a club player is provided with an option for exclusive access to game content or features, according to another alternative embodiment of the current invention.

FIG. 7 illustrates that a player who is a member of the club may have exclusive access to certain "missions" and bonuses that are unavailable to non-members. As one example, a "mission" can be the need for a player to collect a certain number of symbols in a plurality of reel spins so as to achieve a desirable outcome. Each of the missions can have the same expected value (i.e., the payback percentage is the same), but the player may have the perception that one mission is better, easier, or otherwise enhanced than another. After a successful mission, a certain award is provided to the player and/or the player can then move to a further level where there are other missions or awards. As such, the player who is a member of the club is provided with extra game content, creating enhanced player excitement and appreciation for the gaming machine 10.

Figure 8:
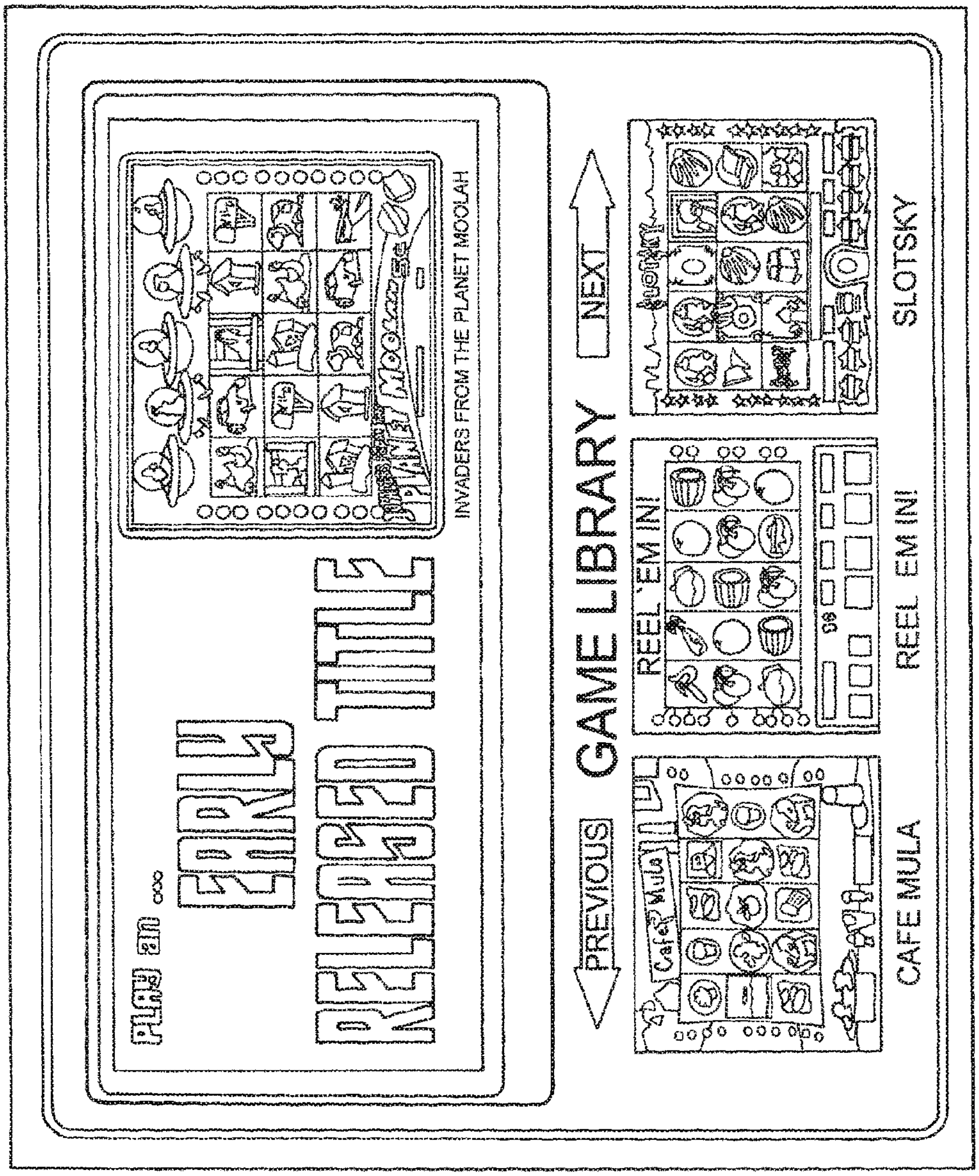
FIG. 8 is an illustration of a screen on the display of the gaming machine in which a club player is provided with on option for early access to a new wagering game in addition to a typical list of wagering games, according to another alternative embodiment of the current invention.

FIG. 8 illustrates a screen for a player who has identified himself or herself as a member of the club and is offered the option to play a newly released game (e.g., "Invaders from the Planet Moolah"), in addition to the game library normally available to the general public. As such, if the club player so desires, he or she can instead play a new game that has yet to be released to the general public. The various games can be stored locally on the gaming machine 10 and released sequentially or randomly at predetermined times. Alternatively, the various games can be stored on an external system 50 and downloaded to the machine 10 on demand, according to a schedule or based on other criteria. In any event, a player who is a member of the club is able to enjoy a new game that would normally be unavailable to the general public for days or weeks later. Further, these games that are available to the members of the club may also be exclusive to only those members such that they are never available to the general public.

Figure 9:
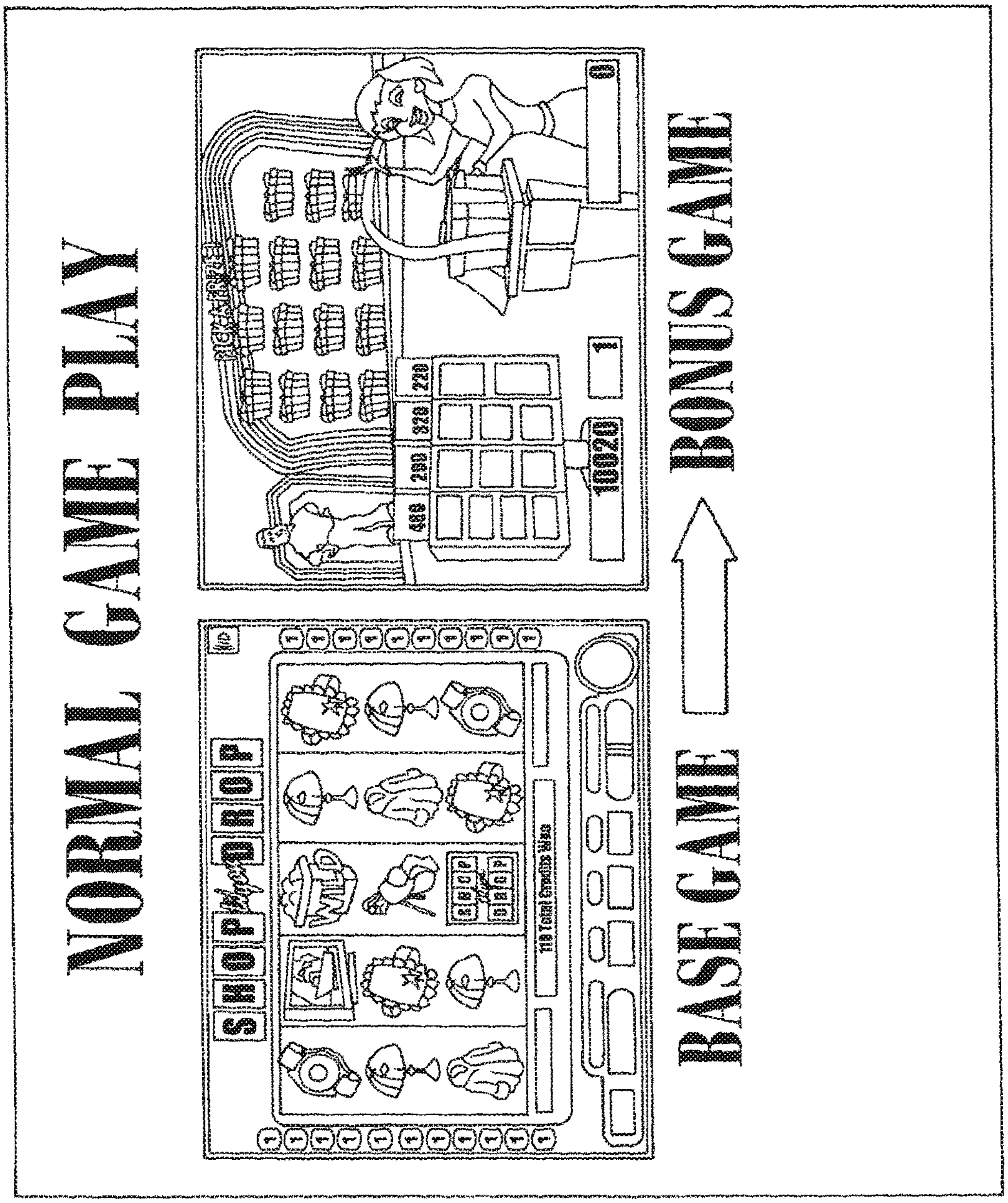
FIG. 9 is an illustration of a screen on the display of the gaming machine in which a normal player is offered a certain bonus game, according to another alternative embodiment of the current invention.

FIG. 9 illustrates a typical game play sequence on the gaming machine 10. A base game is played and, in response to a bonus-game outcome in the base game, a known bonus game is then played.

Figure 10:
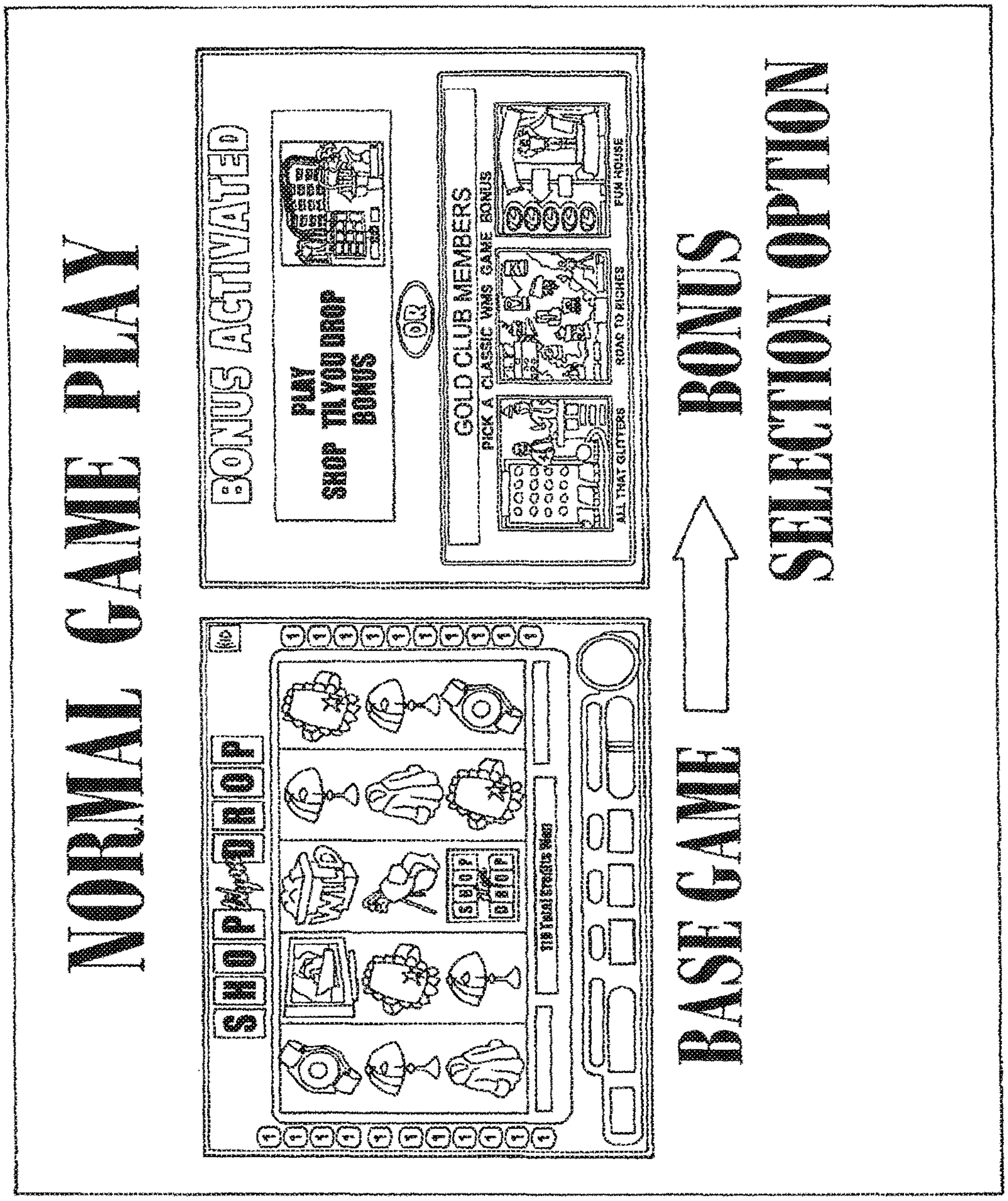
FIG. 10 is an illustration of the screen on FIG. 9 in which a club player is provided with an option for playing several different bonus games, according to another alternative embodiment of the current invention.
Figure 11:
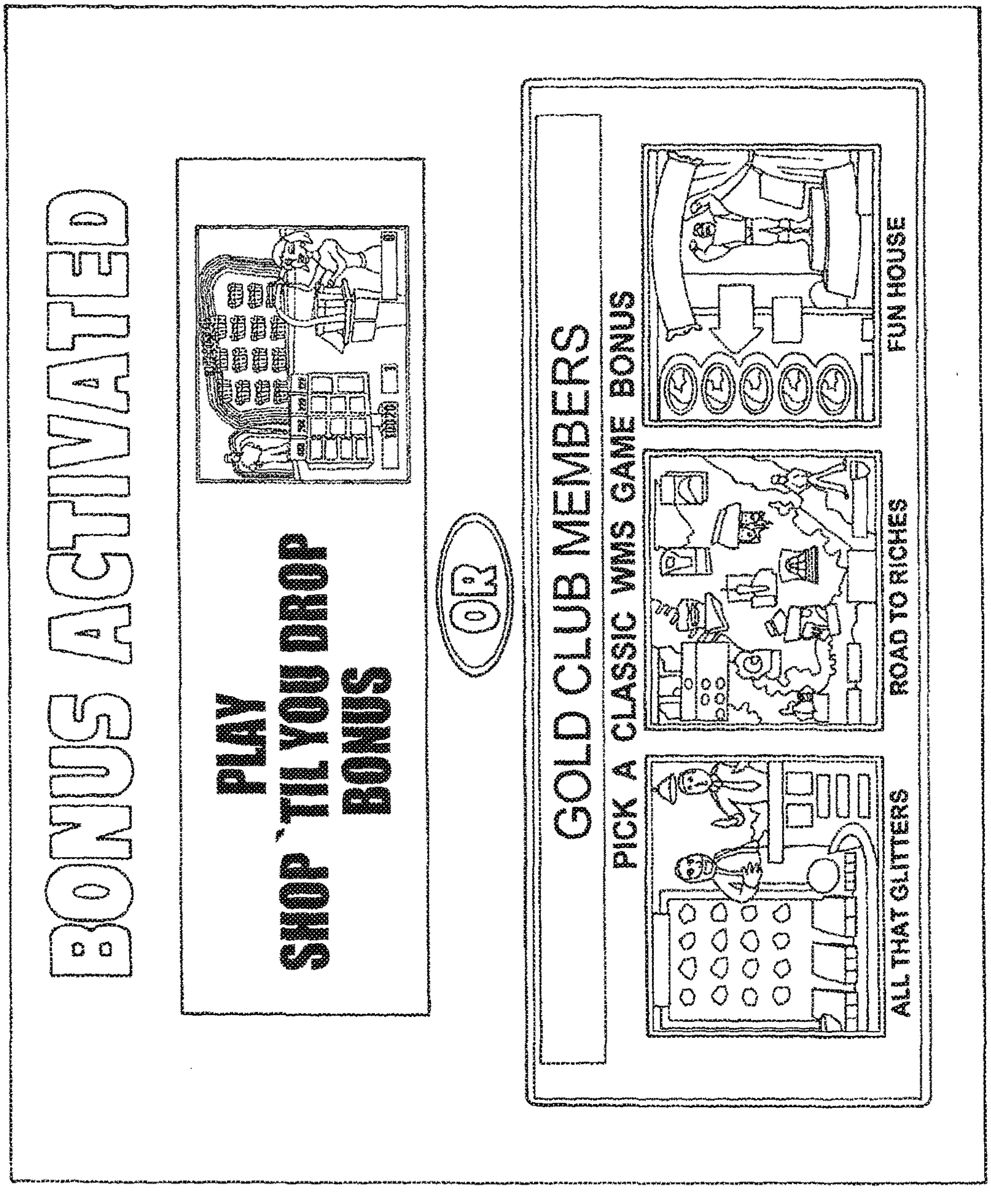
FIG. 11 is an enlarged version of the screen of FIG. 10, according to another alternative embodiment of the current invention.

FIGS. 10-11 illustrate bonus-game options that are available to a member of the club. As shown in FIG. 10, a base game is played and, in response to a bonus-game outcome in the base game, a plurality of bonus games are then made available to the player. As shown best in FIG. 11, the player may play the typical bonus game (FIG. 9) or select from one of a variety of different bonus games. In one implementation, the expected value of the bonus game does not change based on the club player's selection. Rather, the player is simply provided with different game formats, each of which has an expected value that is dictated by the bonus-game outcome achieved in the base game. Consequently, the player who is a member of the club achieves a different gaming experience through the additional bonus-game options offered to the player.

While the present invention has been described with respect to the player using a card to identify himself or herself as a member of the club, there are several other ways in which a player can identify himself or herself. For example, the player may be required to enter information, such as a code or PIN, for identification purposes. Alternatively, a biometric input (e.g., voice, fingerprint, etc.) can be used to identify the player.

Additionally, the present invention is also directed to a gaming machine manufacturer being able to access player-tracking data associated with a casino's club membership. In response to the casino providing access to the player tracking data to the gaming machine manufacturer, the gaming machine manufacturer provides the aforementioned additional enhancements to the gaming machines and wagering games at the casino to those players associated with the casino's club membership. Thus, that casino's club membership should increase because players will desire to receive the aforementioned additional enhancements.

In FIGS. 12-15, which are described in more detail below, a "Big Win!" card is used to identify the player as a member of a "Big Win!" club. Similar to the card described above in reference to FIGS. 3-11, the "Big Win!" card enables features game features that are not available to players without the card. Each enabled feature costs an amount of points and/or a side bet. Thus, to select a game feature, the player must be identified as a member of the "Big Win!" club and must pay a number of points and/or a side bet. The player can use the "Big Win!" card (and the points and/or side bets) in accordance with any of the exemplary embodiments described above in reference to FIGS. 3-11.

According to one example, the player can personalize features of the gaming machine 10 (similar to the player preferences described above in reference to FIG. 3) in exchange for points or side bets. For example, the player inserts the "Big Win!" card into the gaming machine 10 and exchanges twenty points for selecting a preferred sound option configuration. Alternatively, or in addition, the player pays two credits to select the preferred sound option configuration. In another example, the player can personalize the gaming experience (similar to personalizing the gaming experience described above in reference to FIG. 4) by selecting a favorite set of reel symbols. For example, Player Jim can exchange ten points when he uses his "Big Win!" card to select a set of symbols that includes luxury items, e.g., watch, ring, coat, and golf clubs set. In yet other examples, in exchange for points and/or side bets, the player uses the "Big Win!" card to have exclusive access to an early released game (similar to the games described above in reference to FIG. 8) and/or to select the type of bonus round to be played in a base game (similar to the games described above in reference to FIGS. 9 and 11). In alternative embodiments, the player can use the "Big Win!" card and points and/or a side bet to receive any of options described above in reference to FIGS. 3-11.

Figure 12:
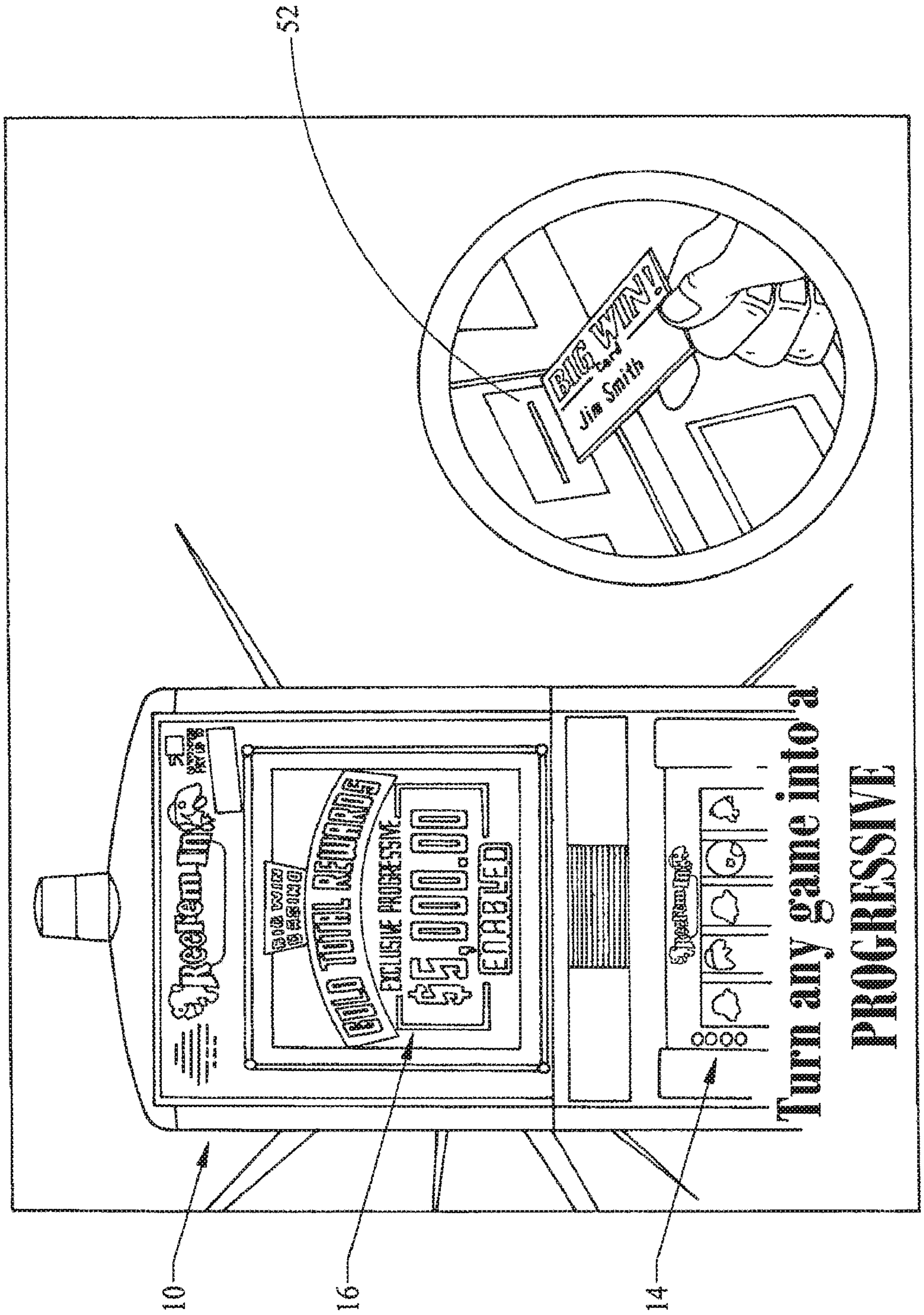
FIG. 12 is an illustration of a screen on the display of the gaming machine in which a club player is provided, in exchange for points or a side bet, with an option to turn any game into a progressive game, according to another alternative embodiment of the current invention.

Referring to FIG. 12, the player can use the "Big Win!" card and a number of points and/or a side bet to turn any game into a progressive game, either a Wide Area Progressive game (which is coupled to other casinos in the area) or to a Local Area Progressive game (which is coupled to other gaming machines in the respective casino). The player inserts the "Big Win!" card in the player information reader 52 of the gaming machine 10, pays fifty points, and begins playing an "Exclusive Progressive" game that makes the player eligible to win $5,000 (as indicated in the secondary display 16).

Figure 13:
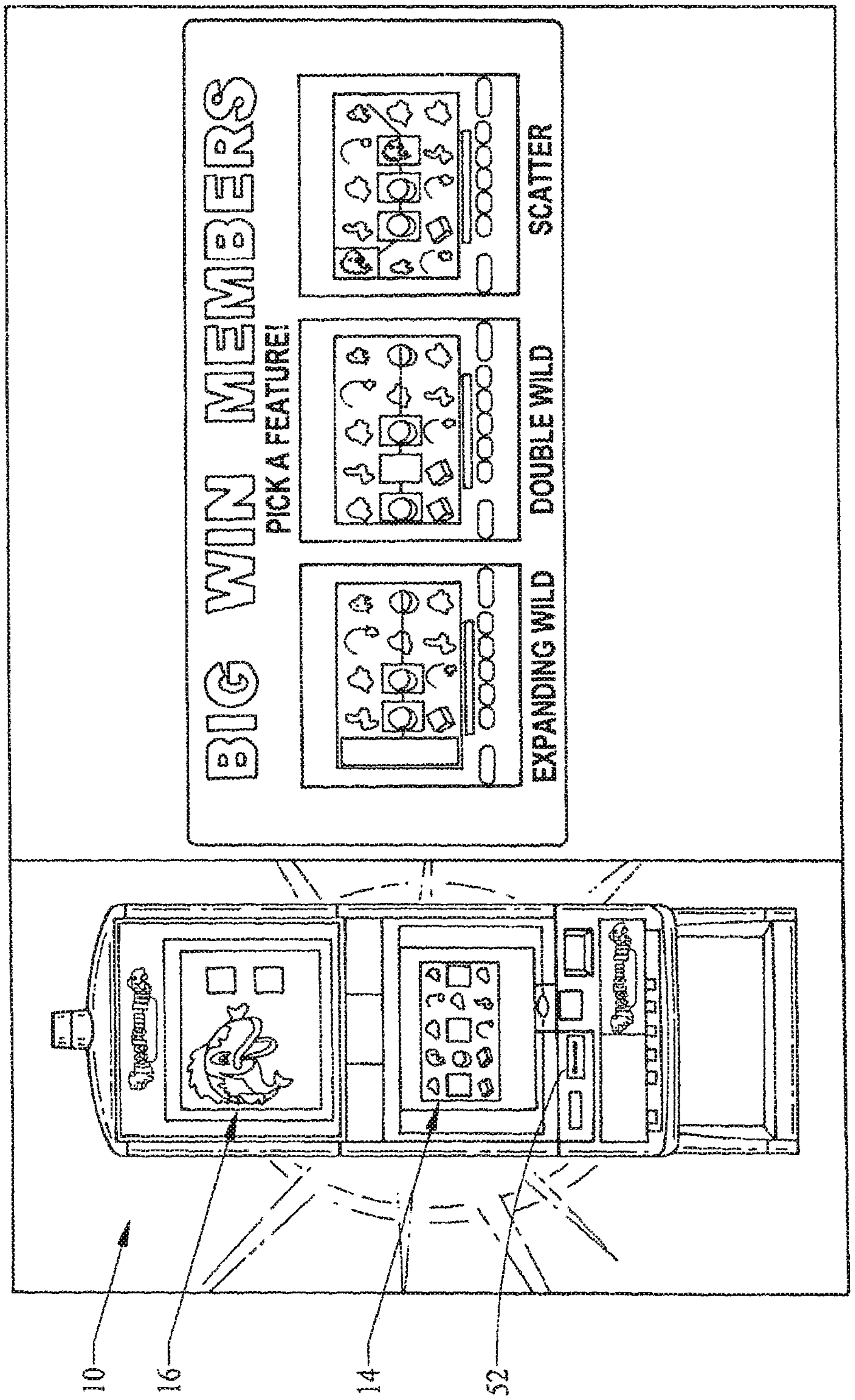
FIG. 13 is an illustration of a screen on the display of the gaming machine in which a club player is provided, in exchange for points or a side bet, with an option to change the type of game features played in the game, according to another alternative embodiment of the current invention.

Referring to FIG. 13, the player can use the "Big Win!" card and a number of points and/or a side bet to change game features. For example, the player inserts the card in the information reader 52 of the gaming machine 10, pays 250 points, and selects a desired feature from a group including an expanding wild, a double wild, or a scatter wild, such that a standard wild symbol is changed to the selected feature.

Figure 14:
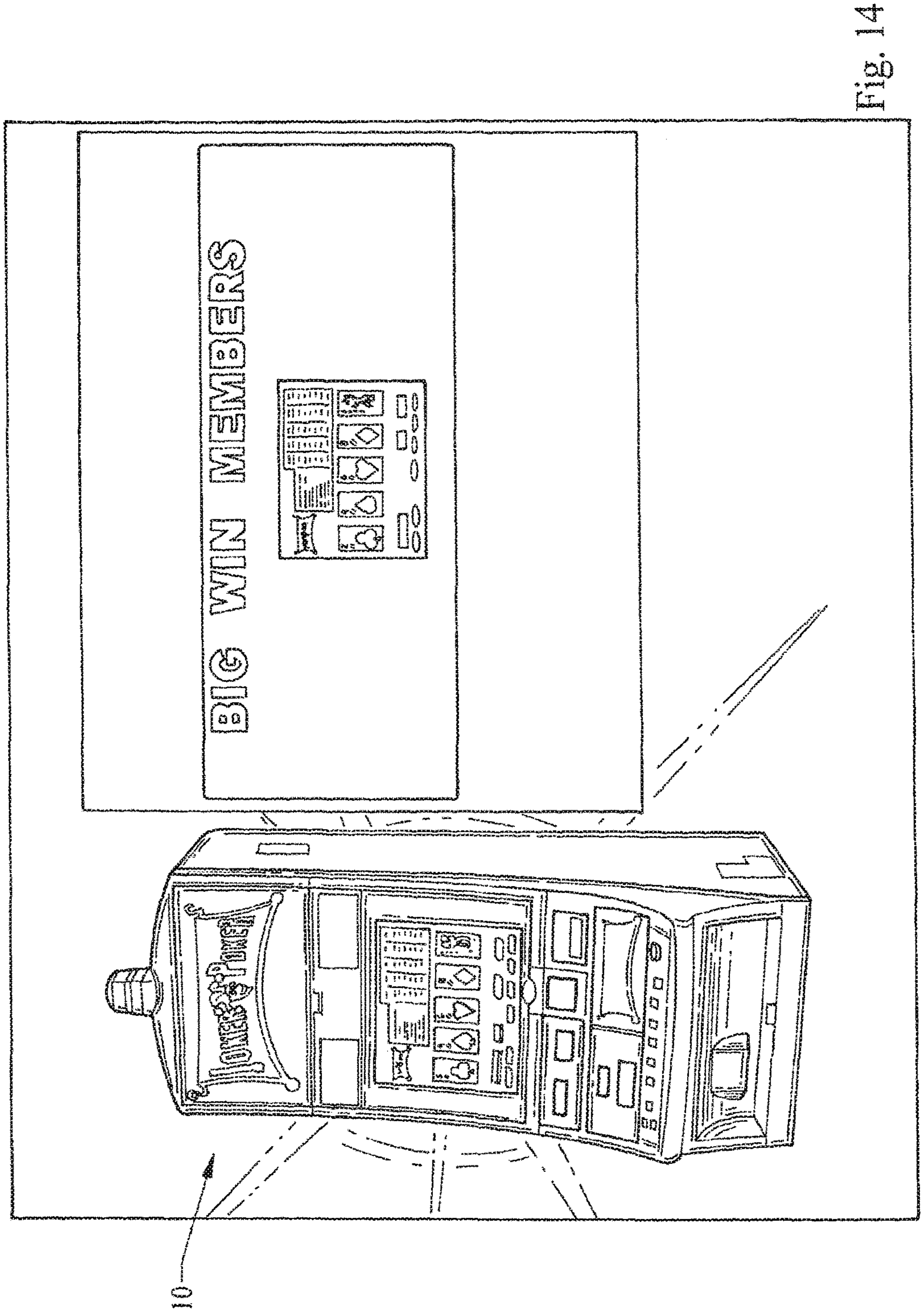
FIG. 14 is an illustration of a screen on the display of the gaming machine in which a club player is provided, in exchange for points or a side bet, with an option to hold wild card in a poker hand, according to another alternative embodiment of the current invention.

Referring to FIG. 14, the player can use the "Big Win!" card and a number of points and/or a side bet to change a feature in a video poker game. For example, after inserting the card, the player exchanges twenty points for the right to hold any dealt wild cards for more than one poker hand.

Figure 15:
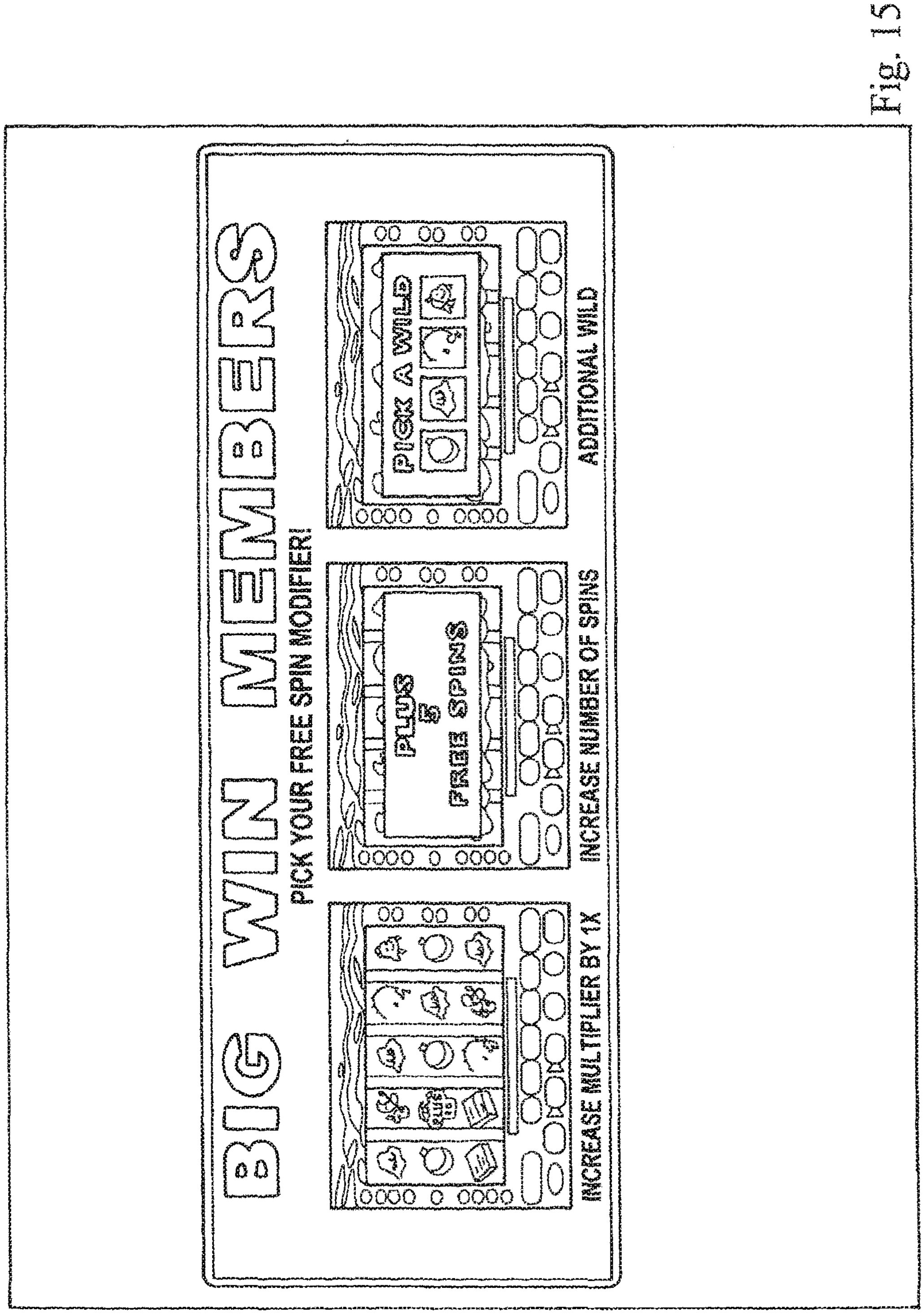
FIG. 15 is an illustration of a screen on the display of the gaming machine in which a club player is provided, in exchange for points or a side bet, with an option to change a free spin bonus round, according to another alternative embodiment of the current invention.

Referring to FIG. 15, the player can use the "Big Win!" card and a number of points and/or a side bet to change features of a free spin bonus round. For example, after being identified as a "Big Win!" member, the player exchanges a number of points to increase a multiplier by one, increase the number of free spins, or add an additional wild symbol.

In FIGS. 16-23, which are described in more detail below, points are provided, redeemed, and used in relation to one or more wagering game aspects, including any of the exemplary embodiments described above in reference to FIGS. 3-15. As such, the players can receive points in addition to or instead of credit awards and can redeem such points for a variety of items, features, and services. A casino can offer the points complimentary, as an expression of appreciation and gratitude for the player's usage of the casino's gaming machines and facilities. Alternatively, points can be funded at least in part by the player or by a third party sponsor. For example, the third part sponsor can be a clothing manufacturer, a soda manufacturer, a food and beverage manufacturer, or a promotion marketing agency. As an example, a casino may reach an agreement with PepsiCo, Inc. to sell only PEPSI products in exchange for PepsiCo, Inc. agreeing to sponsor point-related features in the casino's wagering games.

Points that are funded by the player are funded by a percentage of the wager (e.g., coin-in) received from the player. Thus, a direct cost to the player may be based on the expected value ("EV") of the gaming machine. Points that are funded by a third party sponsor are funded using, e.g., marketing and promotional campaigns. As described in more detail below, the player can receive points in various ways and can receive various things in exchange for points. Further, points are associated with various mechanics.

Figure 16:
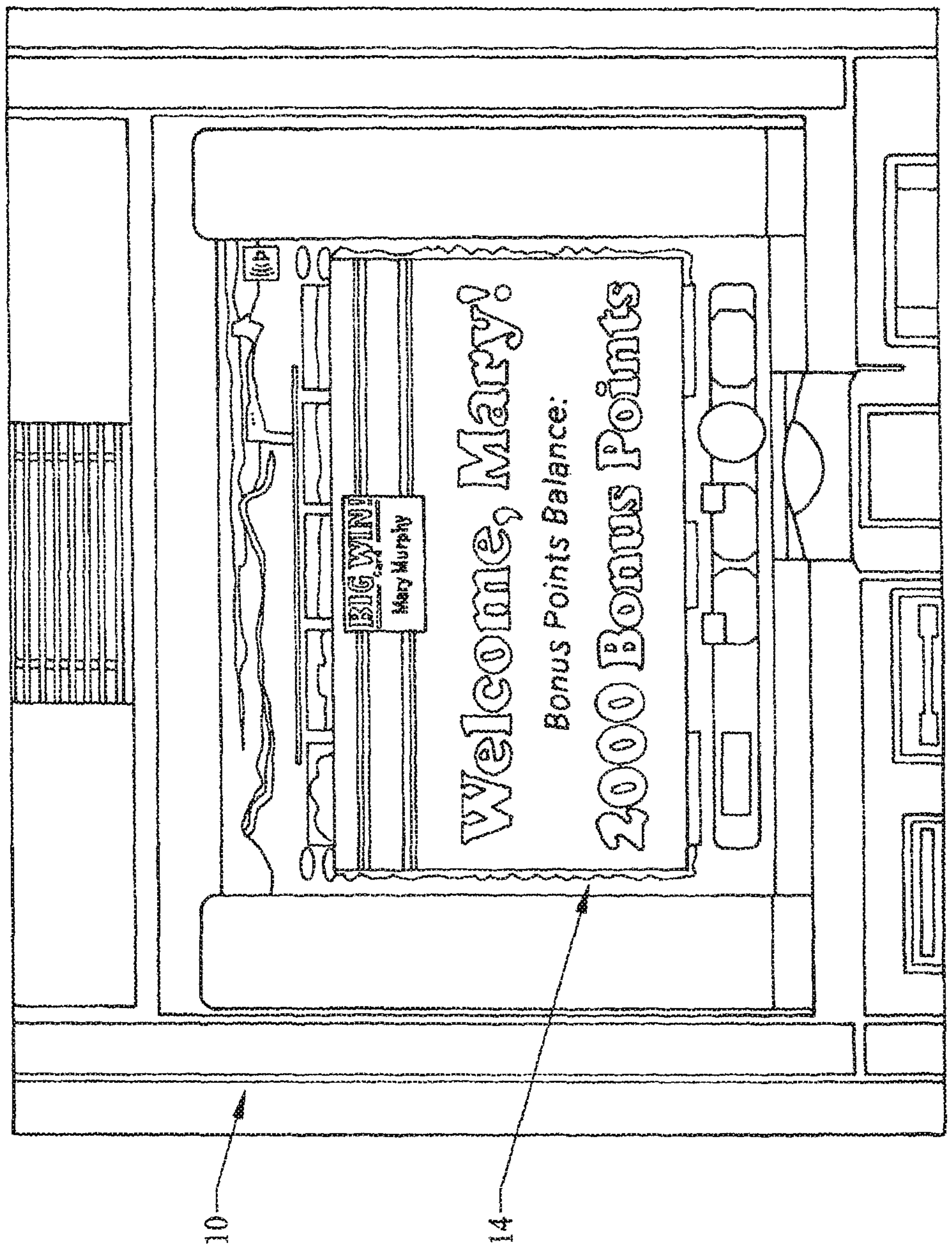
FIG. 16 is an illustration of a screen on the display of the gaming machine that shows a club player a points balance, according to another alternative embodiment of the current invention.
Figure 17:
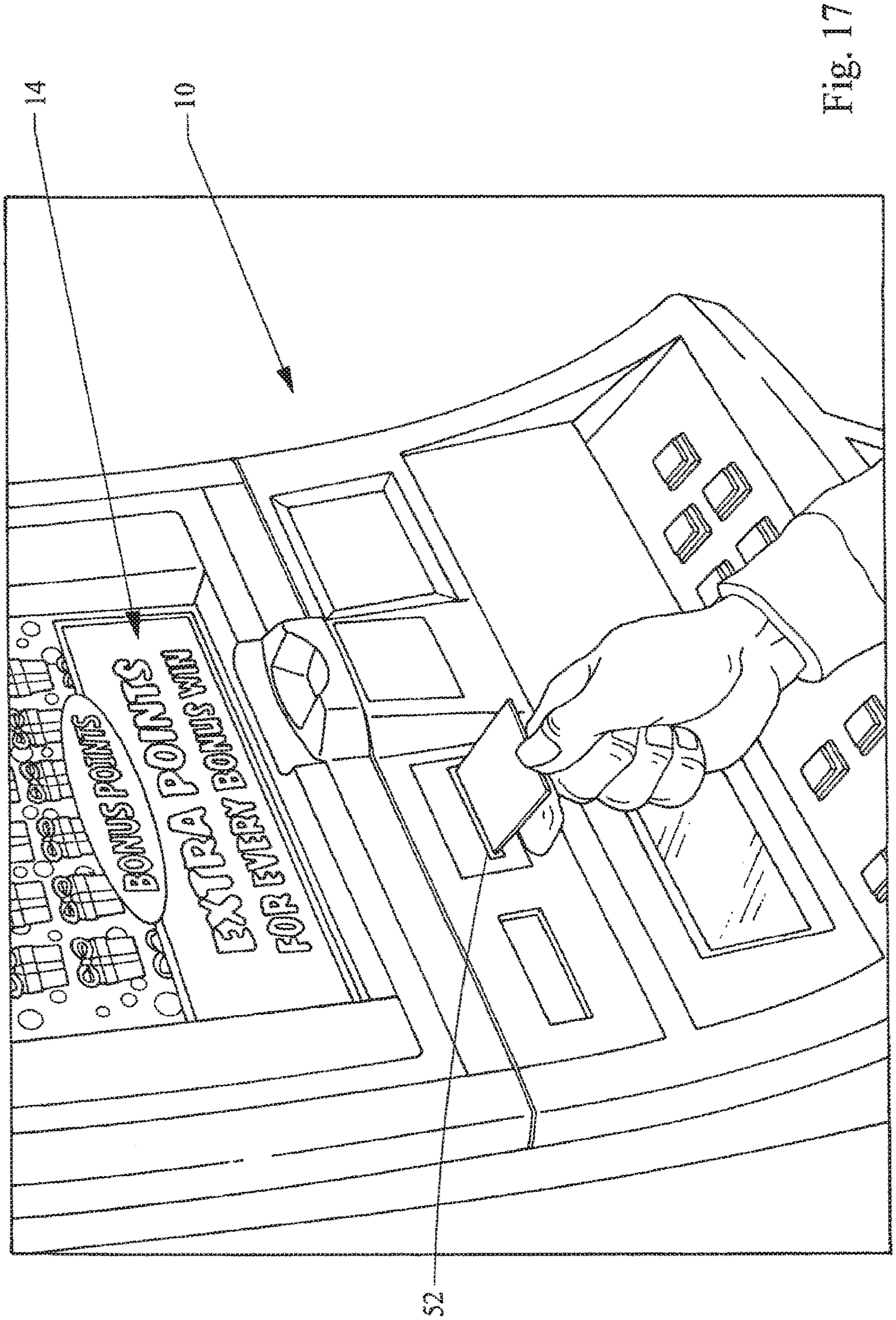
FIG. 17 is an illustration of a screen on the display of the gaming machine in which the player is provided with points for bonus wins, according to another alternative embodiment of the current invention.

Referring to FIG. 16, after identifying himself or herself to the player rewards system, a player begins a gaming session with a certain points balance. For example, Player Mary currently has a balance of "2000 Bonus Points," as shown in the primary display 14 of the gaming machine 10. It is noted that the balance can be any number, including a zero points balance and a negative points balance. The player has numerous ways for receiving points.

I. Ways in which a Player can Receive Points

According to some examples, the points can be received by the player in response to (a) game-play conditions, (b) via marketing and/or promotions, or (c) by purchasing and/or exchanging points. The points can be awarded in a player rewards system, which may include a casino and/or a venue outside the casino. For example, the points can be awarded on a web-enabled device on a casino floor, at a gaming kiosk, or in a hotel room via an in-room system. Thus, the player can simply earn points by playing web games, visiting web sponsors, interacting with a gaming community online or in "real space," via contributions to the gaming community, etc. The earned points can be redeemed online, unlocking features in a casino, on a slot gaming machine, on the internet, via hotel services, purchasing retail items, etc.

A. Game-Play Conditions

Exemplary game-play conditions include playing a game, mystery points, symbol combinations, functions of award and wager, side wagers, introductory new games, double points, auxiliary points jackpots, multipliers based on specific conditions, scavenger hunt, theme-specific games, sweepstakes, revenue, skill-based points, consolation points, etc.

Playing.

The player can receive points in response to simply playing a wagering game. The player can receive points based on coin-in, time-on device, payout, bonus win, etc. For example, referring to FIG. 17, the player can collect points in addition to winning credits during the bonus round. After inserting a card in the player information reader 52 and starting a wagering session, the player can collect points. Thus, the primary display 14 of the gaming machine 10 indicates that "Extra Points" are awarded "For Every Bonus Win." In addition to the gaming machines 10,110 described above, the wagering games can be played on any type of table games that include cards, dice, or other gaming equipment. Some examples of table games are blackjack, four card poker, craps, and roulette.

Mystery Points.

During a wagering session, the player can receive mystery event points. For example, the player plays a base game during which a mystery event is triggered. The mystery event can be a bonus round, a new feature, a new game, a progressive game, etc. The player automatically receives points if the mystery event is triggered during the wagering session.

Symbol Combinations.

The player can receive points for achieving a special symbol combination. The points can be mystery points or points indicated on a paytable. For example, the player is playing a slots machine and hits a cherry-lemon-apple combination. The player can unexpectedly receive 100 points in response to hitting the particular combination. Alternatively, the cherry-lemon-apple combination can be indicated in a paytable as a combination that awards 100 points.

The special symbol combination can indicate a winning outcome that pays a point award instead of or in addition to a credit award. For example, the player can receive 200 points and, optionally, 500 credits. The player may optionally convert the 500 awarded credits into an equivalent number of points (e.g., 50,000 points).

Figure 18:
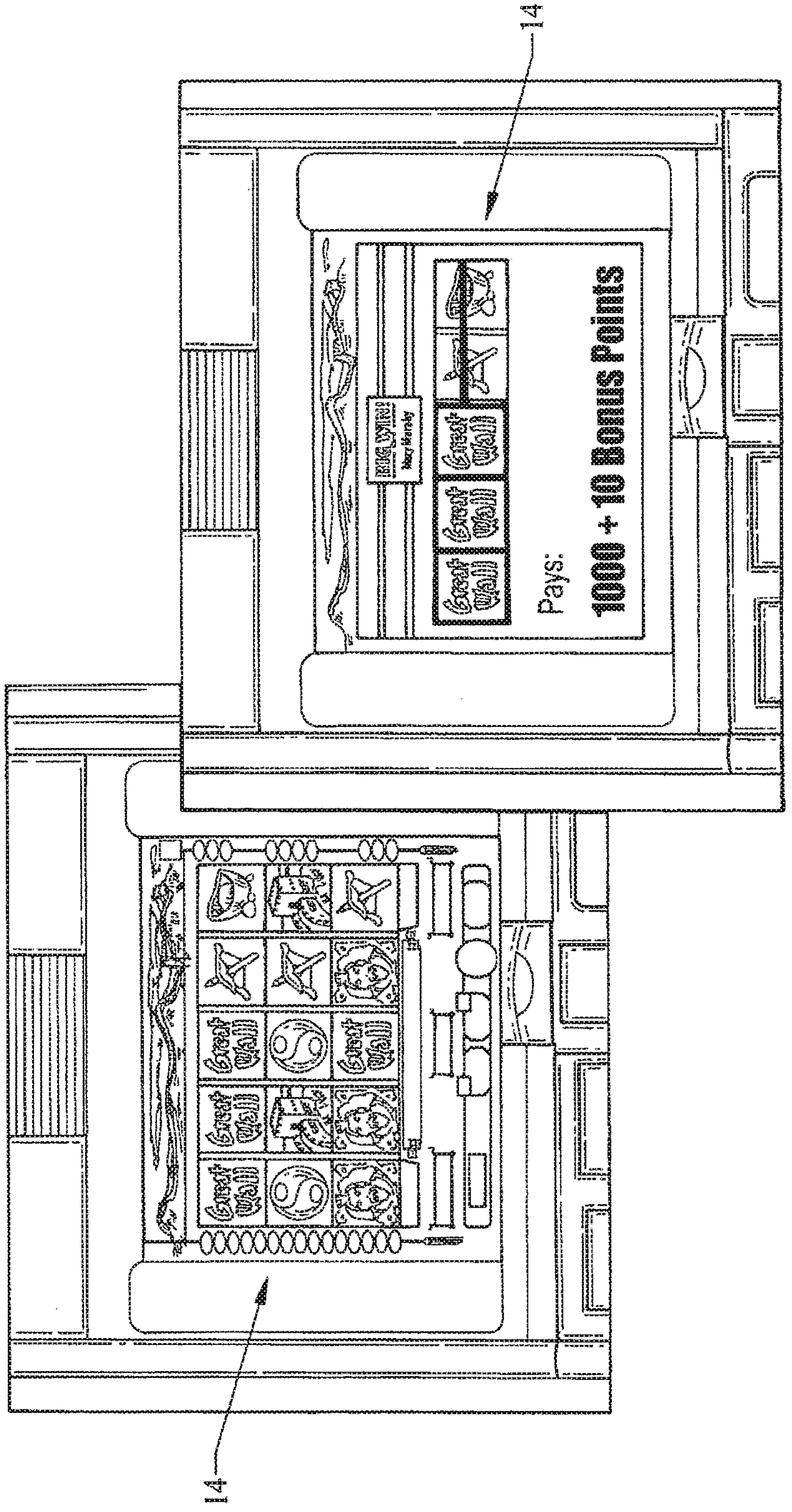
FIG. 18 is an illustration of a screen on the display of the gaming machine in which the player earns points for a winning symbol combination, according to another alternative embodiment of the current invention.
Figure 19:
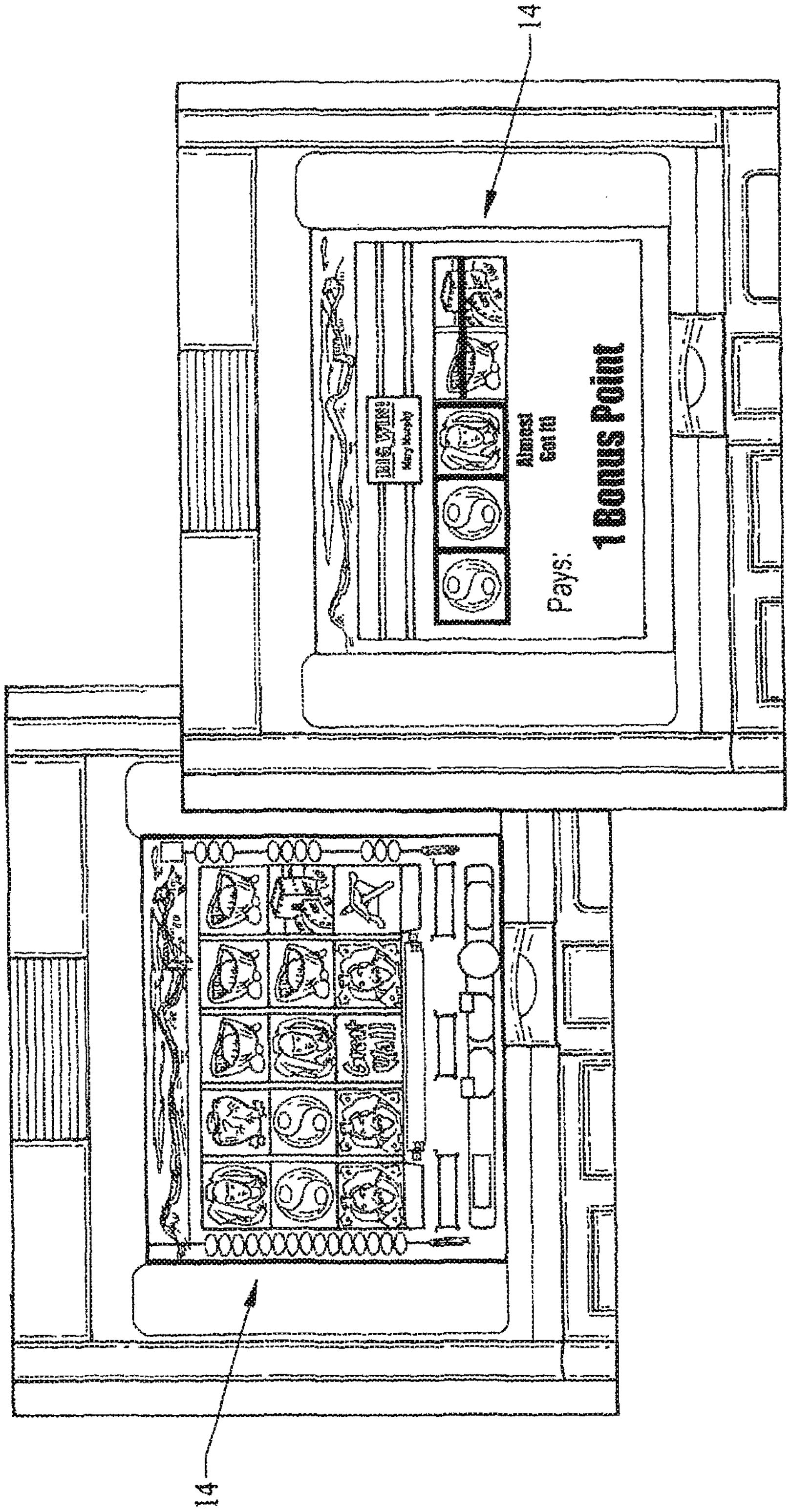
FIG. 19 is an illustration of a screen on the display of the gaming machine in which the player earns points for a "near win" symbol combination, according to another alternative embodiment of the current invention.
Figure 20:
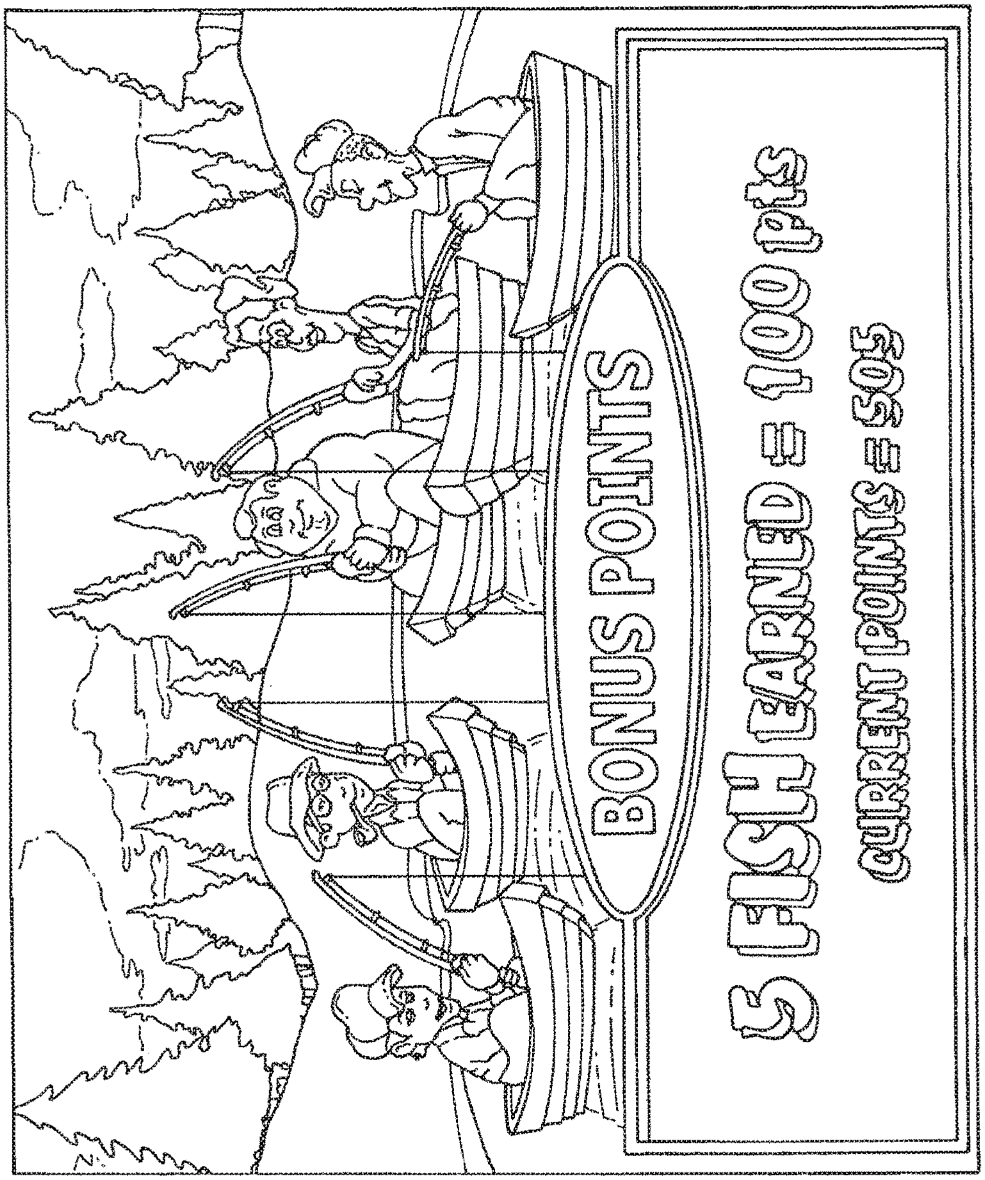
FIG. 20 is an illustration of a bonus screen on the display of the gaming machine in which a bonus game has a fixed point earning system, according to another alternative embodiment of the current invention.
Figure 21:
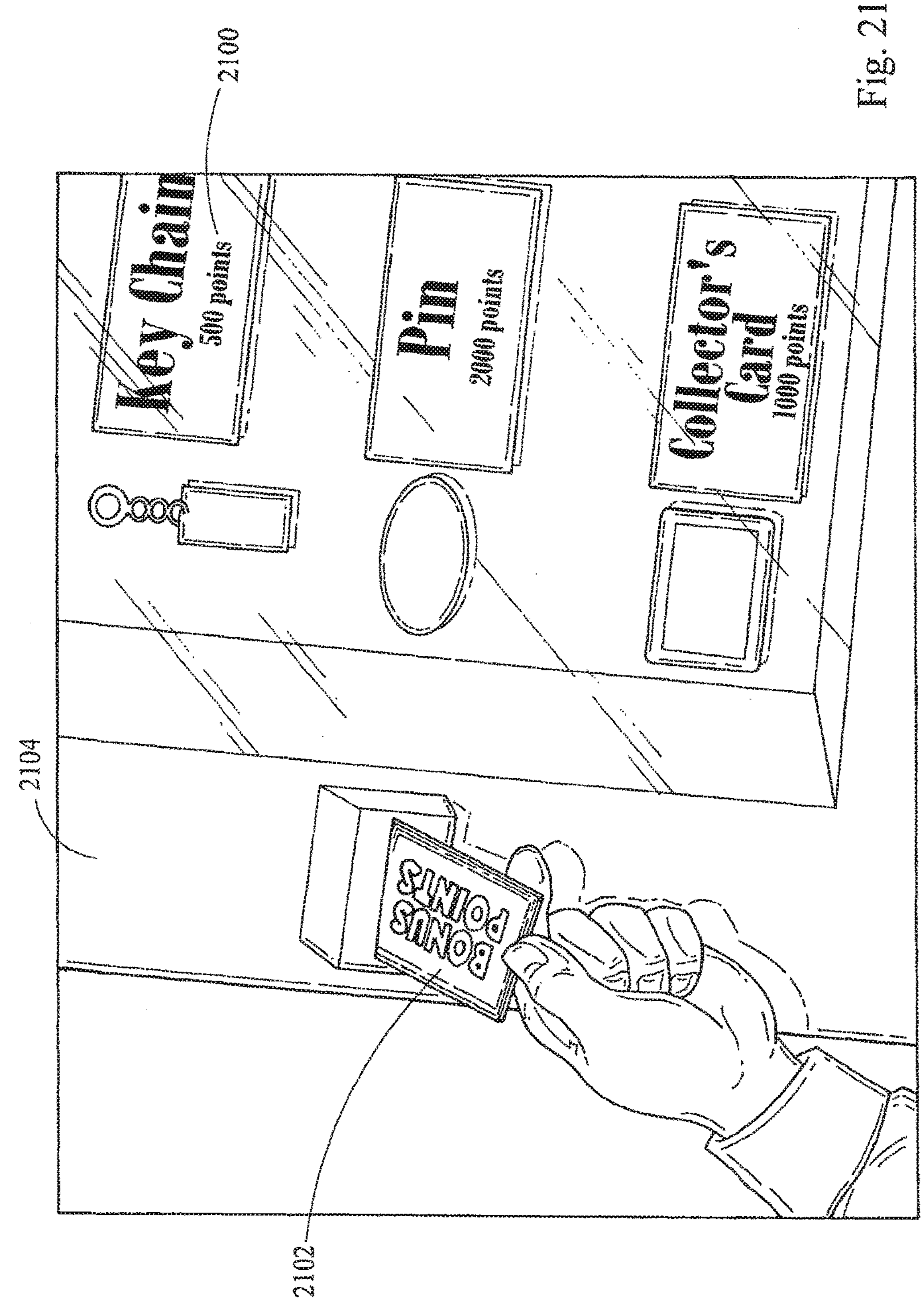
FIG. 21 is an illustration of a vending kiosk used to redeem points in exchange for merchandise items, according to another alternative embodiment of the current invention.

In another example, referring to FIG. 18, the player is awarded points for a three logo pay, along with winning credits for the winning combination. Thus, the player receives 1,000 credits and ten points if three "Great Wall" symbols are aligned along an active payline. In a further example, referring to FIG. 19, the player can receive points for a "near win" symbol combination. Thus, the player receives one point if he receives two symbols of a three-symbol winning combination. In yet another example, referring to FIG. 20, points can be received in accordance with a fixed point earning system, e.g., "5 Fish earned=100 points." Optionally, the display can indicate to the player that he or she has currently accumulated "505" points. In the illustrated fishing game, the player may be excited to be the "lucky" fisherman so that he or she can increase his or her current points by catching as many fish as possible.

Multiply Points Based on Function of Award and Wager.

The player can receive points based on a function of credit award and credits wagered. If the player wins a credit award that is larger than the corresponding wagered amount by a factor of 100, the player receives 50 points; if the credit award is larger by a factor of 500, the player receives 30,000 points.

Side Wager.

The player can receive points based on a side wager during a wagering session. The player wagers a number of credits for playing a wagering game. In addition to the wagered credits, the player can also wager a number of points. If the randomly selected outcome is a winning outcome, the player receives a point award. Alternatively, the player can play a side group game in addition to a regular base game. The player can receive credits for the regular base game and points for the side group game.

Introductory New Games.

Newly introduced games on a casino floor can provide points to the player. For example, a new game can award 100 points to each player that plays the game during the first month of game-play. Alternatively, the new game can award 100 points only for the first ten wagering sessions.

Double the Points.

The player can receive a double amount of points during specific periods of time. For example, players that conduct a wagering session on Tuesdays between 10 a.m.-12 p.m. receive more points than the points received under identical circumstances outside the time period.

Auxiliary Points Jackpots.

Points can be provided by auxiliary points jackpots. In addition to standard credits jackpots, players can be awarded auxiliary (or supplemental) points jackpots. The player can be optionally charged a fee for being eligible to receive an auxiliary points jackpots. For example, the player wagers ten credits during a slots game in which the grand prize is a $1,000 jackpot. Before the selected outcome is indicated, the player is provided with an option to pay one credit or one point to be eligible for a 1,000 auxiliary points jackpot should he or she win the grand prize of $1,000.

Multiply Points Based on Specific Conditions.

Player points can be multiplied based on various conditions associated with the game and the casino facilities. For example, a player that wins 100 points may automatically receive a 2× multiplier if the player rents a hotel room from the casino. Points can be multiplied based on conditions such as length of wagering session, wagering amount, player's Club level, etc.

Scavenger Hunt.

The player can receive points for collecting scavenger hunt items that are collected from a number of gaming machines coupled to the player rewards system. For example, the player can receive ten points for each item collected on the gaming machines and 1,000 points when the player has collected all the items in the set of items. In another example, the player receives 5,000 points if he or she wagers $20 on every game on the floor of a gaming establishment.

Theme-Specific Games.

The player can receive points based on playing theme-specific games. For example, the player receives 2,000 points if the player plays each poker game available via the player rewards system.

Sweepstakes.

The player can receive points from a point sweepstakes. The player can accumulate points over time to buy eligibility to a sweepstakes certificate. If the player is the winner, he or she receives the sweepstakes' points prize.

Revenue Over Time.

The player can receive points as revenue obtained through game-play. For example, in a wagering game with a Monopoly® theme the player buys a hotel for a week and places 1,000 points on the property on which the hotel is located. Any time somebody lands on the hotel, the player receives revenue points, e.g., 100 points.

Skill-Based Points.

The player can receive points based on skill. For example, the player can play a wagering game that also includes a skill portion. The skill portion can be solving a puzzle, defeating a dragon, winning a car race, etc. The better the results in the skill game portion, the higher the number of awarded points.

Consolation.

Players can receive consolation points when receiving an unfavorable outcome. For example, every time the player loses he or she receives a point. Thus, even though the player may not win credits, the player is nevertheless able to increase his or her number of points.

B. Marketing/Promotions

Marketing and/or promotions is another way in which a player receives points. Such marketing and promotions include marketing surveys, free gifts, promotional contests, vouchers, web promotions, partner services, sponsor points, in-game advertisements, special occasions, special event days, etc.

Marketing Surveys.

The player can receive points in response to participating in a marketing survey. For example, the player can fill-out a questionnaire related to casino services and receive 100 points. In another example, the player can receive 1,000 points for participating in a group survey related to new games that a casino is considering introducing on the gaming floor in the near future.

Free Gift.

The player can receive points as a free gift. For example, the player may receive the free gift in return for playing a specific game or gaming machine. As the player walks through a casino floor, available gaming machines may indicate that they are giving away fifty free points to any player that will play a single game-play.

Promotional Contest.

The player can receive points by winning a promotional contest. A gaming manufacturer can create a template for an art package related to a video reel design. Contest participants use the template to create new designs for video reels. The winning player can receive a number of points, or, optionally, receive points as a pseudo-royalty based on coin-in of the games using the winning art design.

Voucher.

The player can receive points if they bring to a gaming establishment of the player rewards system a points voucher. The voucher can be provided by a friend, as a referral, or it can be a mail-in coupon. The player uses the voucher to receive a number of points that are revealed only at the player rewards system. For example, a voucher provided by a friend can provide fifty points and a mail-in coupon can provide seventy-five points. Optionally, the friend that provided the referral receives a number of points if the player wagers in a gaming session at the player rewards system. Further, the referring friend can receive honorary points as a percentage of the number of points that the referred friend has won.

Web Promotion.

A web promotion can provide points to the player. While visiting a website associated with a casino, the player may receive an offer to visit the casino. The player can obtain a printed copy of the offer that the player can exchange for a number of promotional points.

Partner Services.

The player can receive points in exchange for using services or purchasing items from partners of the gaming establishment or rewards system provider. For example, the player can receive ten points each time he or she uses a preferred restaurant, a preferred hotel, or a preferred car rental company. Similarly, the player can receive a number of points each time he or she purchases an item from a partner of the player rewards system (e.g., a Monopoly® game from Toys 'R' Us). In another example, the player can receive points for participating in a specific event, e.g., speaking at a conference that is hosted at a hotel of the player rewards system. Thus, the player can earn points in a non-gaming situation and, then, exchange the points for casino comps (e.g., game features, casino services, etc.).

Sponsor Points.

Points can be received from an official sponsor of the player rewards system. For example, the player rewards system agrees to use only Pepsi® products. In return, players receive ten points for each can of Pepsi® purchased at the player rewards system. The provided points are funded by the official sponsor, e.g., Pepsi®.

In-Game Advertisements.

The player can receive points that are funded by a company who advertises in the wagering games of the player rewards system. For example, the player receives a point each time an in-game advertisement, such as a banner ad, appears during a wagering session. Thus, instead of the player being annoyed by the advertisements, the player may have a perception of being rewarded by the advertisements.

Special Occasion.

The player can receive special occasion points if the player wagers during a special day. For example, points may be awarded on a player's birthday, on a player's anniversary, on a casino anniversary, etc. The casino can offer to award 10,000 points if the player wagers during the special day. In another example, the casino can offer special "come-back" points to players that have not wagered in the casino for three months.

Special Event Day.

The player can receive points on a special event day. For example, the player rewards system can have a "Double-Point Day" to drive occupancy on a notoriously slower day. Every point award is doubled during that day.

C. Purchasing/Exchanging

Purchasing and/or exchanging is another way in which a player receives points. Purchasing and exchanging includes purchasing points, exchanging for other points, helping other players, point matching, etc.

Purchase Points.

The player can purchase points with cash and/or credits. For example, before cashing-out the player may have the option to exchange the won credits for an equivalent number of points. After cash-out, the player may simply use cash to purchase points.

Exchange for Other Points.

The player can receive one type of points in exchange for another type of points. The player may trade standard points, which may have a minimal value, for Player's Club points, which may have a greater value. Similarly, the player can trade a gold point for ten silver points. Optionally, gold points may unlock options that are not available via silver points.

Helping Other Players.

Points can be received in exchange for helping other players. For example, a player with less experience may use the skill of a more experienced player to overcome a particular threshold, e.g., find a hidden treasure in a wagering game. In return, the less experienced player pays the more experienced player with one or more points.

Point Matching.

Points can be matched during a game-play event. For example, if a player that has a Platinum status receives a point award, every player having the Platinum status receives a number of points. In another example, the player rewards system matches points for specific players and/or specific events. For example, the player rewards system may provide the player with one point for every point earned by the player through gameplay.

II. Things Receivable by Players for Points or Complimentary

The previous section referred to the manner by which players obtained points. This section refers to what can be received in exchange for these points. Specifically, players can receive numerous things in exchange for points, including (a) communications, extra items, and miscellaneous, (b) games and features, (c) customization options, and (d) game rule changes.

A. Communications, Extra Items, and Miscellaneous

Some examples of communications, extra items, and miscellaneous things that the players can receive are described in more detail below and include a special welcome, auction items, levels/titles, merchandise, printed image, other point types, sweepstakes entry, other points at different times, suggestions/tips, services, promotions, disabled ads, tournaments, subscription, free play, alerts, advance booking, machine history, personal statistics card, status trade, recognition, avatars, view/listen to non-game information, fortune cookies, chair comfort, hold seats open, etc. Optionally, one or more of the received things can be offered as complimentary things.

Special Welcome.

A player can receive a special welcome message as a complimentary message or in exchange for one or more points. The special welcome message can include a video message, an audio message, or both. For example, when the player begins a gaming session he or she is greeted by a short video film in which a player's relative (e.g., spouse, child, parent) wishes the player "Good Luck!" A favorite "lucky" song of the player can be played and a "lucky" picture can be displayed as the player prepares to begin wagering. The machine can, alternatively, perform other functions to welcome the player. The machine can remember special days associated with the player, such as birthdates, can display a horoscope, the weather, messages from others, demographic messages, ranking statistics, matchmaking messages, the last time the player played the particular game (e.g., "I've missed you, it's been 23 days"), the number of points earned by the player on a particular wagering game or machine, the last jackpot that the player won, objectives completed (e.g., "You made it to planet Vulcan"), suggested games that the player might like, etc.

Auction Items.

The player can purchase auction items with accrued points. The auction items can include, for example, limited edition items of a gaming manufacturer, virtual items, collectible items, free buffets, etc. For example, an auction notice is sent to players that have accrued at least 500 points. A list of the auction items is provided for the players, who can bid points for any of the desired items. The highest bidder wins the respective item. Optionally, a player may hold his or her own auction of items. For example, if a player wishes to increase the number of accrued points, the player could auction collected virtual items such as a rank of Captain to be used in a wagering game with a Star Trek® theme, a Lamborghini car to be used in a racing wagering game, an apartment building to be used in a wagering game with a Monopoly® theme, etc. In another example, a player may have won two free buffets at a casino. The player can auction the free buffet entries in exchange for points.

Levels/Titles.

The player can purchase titles associated with wagering games in exchange for points. For example, each title has an associated price, e.g., a "Lieutenant" title costs 500 points, a "Captain" title costs 1,000 points, and a "General" title costs 10,000 points. If the player is playing a Star Trek® game in which he or she has achieved a rank of "Captain," the player must accrue and exchange an additional 10,000 points to obtain the title of "General" if the player does not wish to wait and earn the title of "General" through gameplay.

Merchandise.

Points can be redeemed for merchandise items like hats, t-shirts, mugs, etc. Thus, after the player has accrued a number of points during a gaming session, he or she can redeem (or exchange) the points for merchandise items that are available at a merchandise kiosk associated with the player rewards system. For example, referring to FIG. 21, the player can purchase various merchandise items 2100 by inserting a bonus-point receipt 2102 into a vending machine 2104. Optionally, the merchandise items can be giveaways items by the casino.

Printed Image.

The player can receive a Big Win Certificate as a complimentary item or in exchange for one or more points. For example, a player plays and wins a big win, such as a $1,000 jackpot. The player can memorialize the win by printing an image of the winning outcome on a plaque, a t-shirt, or any other certificate. Optionally, the player can transfer the image to a plasma display or computer screen for use as a background or screen-saver image.

Other Point Types.

The player can exchange one type of points for another type of points when different species of points are used to play games that use point combinations. Each point exchange can be free of charge or it can cost the player a number of points and/or credits. For example, the player can play a wagering game with a Power Ball® theme in which the player must receive a certain number of red points, a certain number of blue points, and a certain number of white points. If the number requirements are satisfied, the player receives an award. The red, blue, and white points can be received in exchange for standard points. For example, a red point may be received in exchange for two standard points, a blue point may be received in exchange for three standard points, and a white point may be received in exchange for four standard points. Alternatively, the player may use standard points to play the game in which the game awards include combinations of the blue, red, and white points.

Enter Sweepstakes.

In exchange for one or more points, the player can receive a sweepstakes entry. Alternatively, the player can enter the sweepstakes entry free of charge based on a predetermined condition, such as a player status. The player may enter the sweepstakes while the player is wagering on a gaming machine. After entering the sweepstakes, the player waits for a winner announcement at a later time. The player may exchange points for entering the sweepstakes and/or for receiving the winner announcement. Optionally, the player receives complimentary eligibility for entering the sweepstakes.

Other Points at Different Times.

Random bursts of points can be received by the player in exchange for one or more points during specific time periods. Alternatively, the random burst of points can be received complimentary. For example, the player is eligible to receive an increased burst of points (instead of a standard point-award) during an off-peak period in response to the player paying a nominal point amount. Thus, the player may pay ten points while playing between 10 a.m.-12 p.m. on a Tuesday morning to receive, unexpectedly, a random burst of 500 points (instead of a 100 standard point-award) at 10:30 a.m.

Suggestions/Tips.

In exchange for one or more points, the player may purchase wagering game suggestions and/or tips. The game suggestions may be helpful especially if the player is not experienced. For example, the game may indicate to the player that "Tips For Winning $1 Million Jackpot Are Available For 10 Points Each." Optionally, one or more of the suggestions and/or tips do not cost any points. In other examples, the player receives information regarding tutorials, strategic information (for such games as video poker), etc. The tutorials show the player what the player should have done in certain games or are real-time tutorials advising the player how to proceed in a game. Other suggestions include services, such as a suggestion to eat at the casino coffee shop if the player has been playing for more than two hours and it is breakfast time.

Services.

In exchange for points the player can purchase items related to lodging, entertainment, dining, and other services. For example, the player can purchase a hotel room for two nights in exchange for 20,000 points. In other examples, the player is allowed access to specific facilities such as a swimming pool, a golf course, etc. Optionally, the services can be provided for free, as complimentary services by the player rewards system. For example, a casino may offer free lodging for a player that has established a reputation of wagering over $5,000 per day. Other exemplary services include having the player being paged at the machine that the player is currently playing when a reservation becomes available. For example, the player has made a dinner reservation and is currently waiting for it to become available. While the player is waiting, he or she continues playing at a gaming machine. A video or audio page makes the player aware that his or her reservation is now available.

Promotions.

Points-only promotions can be offered to players based exclusively on a point system. For example, special rates on services or products may be indicated on the bottom of a gaming machine in return for a point. The player may have the option to turn the promotional announcements on or off. The players can accept a particular promotion in exchange for a respective required number of points. Alternatively, some promotions can be offered to players at no charge.

Disable Ads.

Players can exchange points in return for disabling advertisements. Instead of receiving advertisements on the gaming machine, which may be considered a nuisance, players can use points to disable them for a period of time, a number of wagering sessions, or a number of plays. The longer the period that the advertisements are disabled, the more points that can be charged. Optionally, players associated with a predetermined condition can disable the advertisements at no cost to the player. In alternative embodiments, the player can accept, reject, or opt-out from any casino offers (e.g., opt-out from receiving free buffet coupons).

Tournaments.

Slot tournaments can be operated based at least in part on a point system. Points can be used for eligibility, wagers submitted, and/or awards received during the slot tournament. For example, eligibility to enter the slot tournament may require that the players have accrued at least 1,000 points during the previous three months. The slot tournament can award point-based jackpots.

Subscription.

The player can receive a specific subscription in exchange for a number of points. For example, the player can pay 100 points a month to subscribe to a monthly magazine for gambling tips and suggestions.

Free Play.

The player can buy a "free trial play" with points. The "free trial play" allows the player to experience a new game so that the player can decide whether he or she would wager their own money on the game.

Alerts.

The player can receive alerts regarding which games are available. The alerts can be received free of charge or in return for points. For example, the player can receive an alert that a desired game is now available. Optionally, the alert can include a map indicating the specific location of the gaming machines on which the game is available. In yet another example, a jackpot is broadcasted digitally to all players. The player can optionally customize his or her own map to indicate favorite gaming machines. Alerts can also be provided to display winning outcomes that the player has missed while he or she was absent from the casino (e.g., "While you were eating FOUR players won Big Event wins).

Optionally, the alerts can indicate the place where the game is available for play, e.g., casino name, state, city, etc. The player can define parameters such as games that he or she wants to play, preferred casinos, distance range from his current location, denominations, etc. The alerts can be available on any gaming machine, handheld device, and gaming kiosk, and via the internet, email, wireless messaging, paging, text messaging, etc. Information related to the alerts can be printed using ticket printers in the gaming machines. For example, the ticket printers can be used to print directions and maps to the casino where the game is available. Optionally yet, the player can request a particular casino to offer a particular wagering game. In return, the casino can use the information as feedback for determining popularity of particular games.

Advance Booking.

The player is provided the ability to make reservations in advance. The advance booking option can be made available free of charge or in return for points. For example, the player can make car, airplane, and dinner reservations without leaving the gaming machine on which he is currently conducting a wagering session. In another example, the player can make a reservation to play a particular wagering game or a particular gaming machine (e.g., a lucky-spot gaming machine) at a particular time. When the game or gaming machine becomes available, the player is notified and gameplay on the applicable gaming machine is disabled until the player begins gameplay on it (or at least for a certain amount of time). In alternative embodiments, the player can make reservations from any place, including the casino floor, home, hotel, restaurant, etc.

Machine History.

The player is provided with a recent pay history of gaming machines of a casino floor. Using the pay history, the player can go to play on a "hot" machine of the casino floor. Optionally, the pay history is provided complimentary and/or in exchange for points. For example, the pay history can show five of the top ten "hot" machines as a complimentary feature, and, in exchange for five points, the remaining five "hot" machines. According to an alternative embodiment, the player is provided with a detailed history of a particular gaming machine. For example, the history can include the number of credits and points awarded in the last twenty-four hours (e.g., 2,500 credits and 36,000 points). In another example, the player can view more detailed math underlying a wagering game to better assess the chance of hitting a particular feature (e.g., the machine indicates that a triple cherry combination has a 380 to 1 chance of being hit). Similarly, the player can view "overdue" combinations that have not hit as often as generally expected.

Personal Statistics Card.

The player can receive a personal statistics card similar to a common baseball card. The player card can be used, traded, or sold for points, credits, or other items. The card can be received for points or as a complimentary feature.

Status Trade.

The player is provided with an option to give/trade status with another player. For example, a player that has achieved Platinum status can trade the status with a player that has a Gold status. The status trade can be performed in exchange for points or can be offered as a complimentary option.

Recognition.

The player rewards system can recognize a player for his or her achievements. For example, the player rewards system can display a picture of the player on a large plasma screen to indicate that he or she has just won a large bonus award. In another example, a public announcement is made to all the players on the casino floor that player "Smith" has just won the large bonus award. Alternatively, if player "John G" has just won a $12,000 jackpot, every player receives scrolling text at the bottom of their respective display with an announcement indicating the jackpot win. The player recognition can be offered complimentary or in exchange for a number of points. In other examples, premium players are identified using, e.g., flashing lights. A light on top of a gaming machines flashes to indicate to service people, e.g., bartender, waiter, etc., that a premium player is playing on the respective gaming machine. Alternatively, premium players can opt-out so that they are not identified.

A video projection mat, which is generally a giant floor display, can be used to play various wagering games to further enhance gameplay experience. For example, the video projection mat can display a giant slot machine in which only selected players are permitted to participate based on specific conditions associated with the players (e.g., based on a number points accumulated by the players). The use of the giant slot machine provides recognition to the player. The video projection mat can also be used to show player outcomes. In alternative embodiments the player can use other "big experience machines," which are larger than standard gaming machines, to gain recognition in the player rewards system. Optionally, game outcomes are displayed on large screens.

Avatars.

Avatars can be displayed as a complimentary offer or in exchange for points. For example, avatars can be displayed for prestige players to recognize the player as a valuable casino player. Optionally, a player can select which avatars he or she wants to be displayed. The avatars can be displayed in numerous ways. For example, a large plasma screen can display avatars for each player in the casino and, when a player wins an award, can show the respective avatar jumping up and down. In another example, the avatar can be indicated on a player tracking card (e.g., e-paper tracking card) along with the player status. In yet another example, the avatar can be displayed on a primary or secondary display of a gaming machine being played by the player. The avatars can be displayed in community games on the casino floor and/or on the internet for players playing along or watching from home. Optionally, the avatars can be awarded as bonus symbols and/or can be incorporated in animations (e.g., Big Win animations).

Avatars can also indicate medals of achievement. The medals of achievement can be associated with outcomes or other game-related outcomes. For example, while playing a wagering game with a treasure hunting theme (e.g., Tomb Raider® theme) the player locates a rare gem at a top of a mountain. The medal of achievement shows to all the players that a particular player has found the rare gem. Optionally, the medal of achievement can be indicated as an online accomplishment.

In alternative embodiments, avatars can be displayed as symbols on a player status bar. The symbols can be selected from symbols sets associated with the player level. For example, in a community wagering game with a Monopoly® theme the player receives a gold car symbol that is associated with the respective player's gold level.

The avatars can be used to indicate game outcomes via a simulated life, animated leader boards, player travel history, avatar battles, etc. Thus, the avatars can be used as expressions of a players' wins and losses. For example, when the player loses all the wagered credits, a simulated life shows a penguin walking around with its pockets turned inside out and holding a "Will work for Fish" sign. In another example, a foreclosure sign is placed on a house associated with a player when the respective player is having a bad losing streak. In yet other example, a front yard of a player's mansion has blue water that turns to brown to indicate streaks of bad outcomes. Alternatively, the simulated life avatars can include a city block in which buildings represent players. When a player begins a wagering session, the player's corresponding building rises from a two-dimensional form to a three-dimensional form. If, for example, the player wins a 10,000 credit award, the player's building receives a brand new BMW car in the driveway. If the player wins a 80,000 credit award, the BMW car is replaced with a Lamborghini car. Alternatively yet, the avatars can be displayed in an animated leader board in which the player can readily see other players' game outcomes and provides an incentive for the player to keep up with the other players. In another example, players receive passport stamps on a map for visually indicating the player's previous games, bonus rounds, etc.

View/Listen to Non-Game Information.

The player can view, listen, and/or use communication means for non-game related information. For example, the player can watch television channels, can listen to radio stations (including satellite radio), can make long-distance telephone calls, can browse the internet, can check emails, etc. The information channels can be complimentary or can be provided in exchange for points.

"Fortune Cookies."

The player can receive complimentary tickets that show a fortune. For example, the player can receive a fortune telling him or her that the next bet should be a max bet or indicating lucky numbers that can be used in a wagering game with a Powerball® theme. Optionally, the fortune tickets are received in exchange for points.

Chair Comfort.

The player can enhance the comfort of a gaming device either in exchange for points or by accepting complimentary offers. For example, the player can use points to enable or enhance foot rests, lumbar supports, massage devices, etc. In one example, the player pays twenty-five points to make a gaming chair vibrate for two minutes, and an additional ten points provides a seat warmer for the chair.

Hold Seats Open.

The player can request that nearby gaming machines remain open for a time period determined by player demand. For example, the player can request to keep adjacent gaming machines from being used by other players until all other gaming machines are being used. Thus, the adjacent gaming machines can display a message that it is unavailable for gameplay until gaming machines X, Y, and Z are being used or until player "Smith" has finished gameplay.

B. Games and Features

According to alternative embodiments, the players can receive games or features that are new or enhanced in exchange for points. For example, the players can receive an early release, unlocked features, different bonus games, exclusive games, community event, point-based games, mixed games, unique point paylines, scavenger hunt items, replay feature, priority selection, game/player ratings, increase maximum bet, play multiple games, secondary symbols, jackpots thresholds, mystery bonus awards, etc.

Early Release.

The player can receive an early release of a wagering game in exchange for one or more points (similar to playing the newly released game described above in reference to FIG. 8). For example, in exchange for twenty points, a player rewards system can provide a future episode of a popular wagering game thirty days earlier than the date that the episode is made available to the general public. The player may happily exchange the twenty points for playing a long-awaited episode, especially if the player is likely to receive 100 points or more during game-play. In alternative embodiments, the player can preview trailers of new games in exchange for points.

Unlock Features.

The player can add features to games in exchange for one or more points (similar to accessing certain features of the wagering game as described above in reference to FIGS. 6 and 7). For example, in exchange for a number of points the player is given access to and eligible to win a progressive game jackpot. Although the points are used to determine that the player is eligible for the progressive jackpot, player credits may be used to fund the progressive jackpot. Thus, ten points can be used for adding the progressive option (i.e., a side wager of ten points) and one credit per game is used to fund the progressive jackpot. The progressive jackpot may be made available only via points and/or only to specific players. Accordingly, the player may feel privileged to have the option of playing for the progressive jackpot. In alternative embodiments, the player unlocks bonuses for friends. The unlocked bonuses are provided to the player's friends as a complimentary offer or in exchange for points.

Different Bonus Game.

For a number of points the player may select a different bonus game than a standard bonus game. While the player plays a base game, he or she may receive an outcome that awards a bonus game (similar to the bonus-game options described above in reference to FIGS. 10-11). In addition to the awarded bonus game, the player may also be provided with the option—which costs a number of points—to select a different bonus game having a different format and/or range of awards. Thus, the player can select a bonus game that is more likely to satisfy the player's goals. The option of selecting a different bonus game provides the player with a feeling of power of control over what the player plays. Alternatively, the player is provided with one or more complimentary secondary games.

Exclusive Games.

In exchange for a number of points, the player is provided access to an exclusive library of wagering games, such as "on demand" games. The library can include previous, current, and future games. Thus, if the player desires for nostalgia reasons to play a game that has been long taken out of circulation, the player can buy access to the game from the exclusive library that is made available only in exchange for points. Games can be downloaded from a server that is remote from the gaming machine. Depending on the desirability and/or popularity of a game, the player may be charged more or less points. Optionally, the player may pay a set number of points on a regular basis to receive access to the entire library. For example, the player may pay twenty points a month to become a member of the exclusive library. Optionally, the player is provided exclusive access for free as a sign of appreciation by the casino if the player meets a predetermined criterion, e.g., the player is a first time visitor of the casino.

Community Event.

Optionally, the player can exchange points for access to a community event (i.e., a multiplayer wagering game) or a progressive jackpot (similar to the progressive jackpot described above in reference to FIGS. 5 and 12), and to become part of an Elite VIP club. The player can purchase eligibility to play in the community event by using points. The player can participate in the community event from some or all of the gaming machines on the floor of the gaming establishment depending upon the construction of the machines and gaming network in which such machines reside. In another example, the player can use points to gain access to a progressive game. The player can also use points to receive Elite VIP treatment, which can include receiving special offers, points, priority restaurant seating, etc. For example, if the player acquires 10,000 points, the player is eligible for the Elite VIP treatment in exchange for 100 points per month. In other examples, the player is provided access to other rare events that are made available only during certain periods of time or only to certain players.

Play Point-Based Games.

The player can play wagering games that are based solely on points. Specifically, the credit meter uses points instead of credits (i.e., the credit meter becomes a point meter). In addition, at least some of the winning outcomes award only points. For example, the player may wager 100 points for ten slots spins. In return, the player may win 1,000 points during the slots spins.

Play Mixed Games.

The player can play wagering games that use a mixture of credits and points. The wagering games can use credits and points for wagers, awards, or both. For example, the wagering game can have both a credit meter and a points meter for wagering in a slot reels game. The player may wager ten credits and fifty points to activate ten paylines of the slot reels game. If a winning outcome is achieved the player may receive an award that includes credits and/or points (e.g., 100 credits and/or 5,000 points).

The game can have a single paytable for both credits and awards or a single paytable for credits and a single paytable for points. For example, if a single paytable is provided for both credits and awards, the awards may be indicated by showing that a specific winning combination (e.g., cherry-cherry-cherry) awards 100 credits and 5,000 points. Alternatively, if separate paytables are provided for credits and points, specific winning combinations can be provided independent of whether they are awarded for credits or for points. For example, a cherry-cherry-cherry combination may award 100 credits and zero points, while a cherry-lemon-orange combination may award zero credits and 5,000 points. Thus, the player can play two games generally simultaneously, one game based on credits and one game based on points.

The credit/point award can vary based on the wagered amount. For example, the player may initially wager one credit for a wagering game that awards a specific credit amount. In addition, the player can wager a side bet to enable a point award. Thus, if the player initially wagers one credit to enable ten paylines on a slot machine that pay only credit awards, the player may also submit a side wager of ten points to enable ten additional paylines on the slot machine that pay only point awards. Thus, the player may feel like a winner even though the credit meter may be decreasing because his or her point meter may be increasing. Optionally, the player may pay points to unlock a game that is based solely on points. In yet another option, the player can select whether they wish to be awarded cash (or credits) or points. The cash or points option can be made available before the game starts, during the game, or after the award has been received but before the player has cashed out his or her winnings. The player may be charged more points if the player makes a decision later during the game than earlier during the game. The player or operator can configure a slot machine for a points, credits points, or bonus and points (or percentage of the bonus and credit points) for one or more winning combination. Thus, the player is given the ability to enable the mixed play combinations.

Unique Point Paylines.

When playing on a slot machine, the player can select at least one payline that pays credits and at least one payline that pays points. For example, all left-to-right paylines pay in credits and all right-to-left paylines pay in points.

Scavenger Hunt Assistance Items.

The player can exchange points for scavenger hunt items that are acquired on one or more gaming machines of the player rewards system. For example, the scavenger hunt requires the player to play each gaming machine in a prescribed set of gaming machines so that the player can acquire a series of items, each item being associated with a respective gaming machine. Each item can be made available to the player in response to the player playing the respective gaming machine and to the player exchanging one or more points for the item. Optionally, the player can exchange points for hints on where to easily obtain a next item.

Replay Feature.

The player is provided an option to replay one or more previously played games in exchange for a number of points. For example, after winning a large bonus award, the player can touch a screen and watch a replay of the bonus game. In another example, the player can watch the top ten bonuses of the day as motivation before he or she begins gameplay. Optionally, the player can send a replay message to a friend at another gaming machine.

Priority Selection.

In exchange for points, the player is provided with a priority selection feature based on a predetermined condition associated with the player. For example, when playing a community game, player selection is prioritized based on player status. Thus, a Gold Level player will make a gameplay selection before a Silver Level player.

Game/Player Ratings.

The player has the option to rate a wagering game or a player. The rating option is provided in exchange for points or as a complimentary option. For example, the player can rate a game with a "thumbs up" or "thumbs down" rating. Optionally, the player can exchange points for viewing ratings of other games when deciding which games to play. The casino can use the ratings to determine marketing strategies for new games or for game locations.

Increase Max Bet.

The player can receive an option to increase a maximum wager amount in exchange for a number of points. For example, in response to the player triggering five bonus features during a single wagering session, the player is notified that he or she can now wager a maximum wager amount of $100 instead of $50 in exchange for 50 points.

Play Multiple Games/Machines.

A player can, in exchange for points or as a complimentary offer, play multiple games simultaneously. For example, the player can play slots games on the machine on which he or she is physically located and on the two adjacent machines. In another example, the player plays a plurality of games on a single gaming machine. For example, the player plays a slots game and a poker game on the same gaming machine. In alternative embodiments, the player can place wagers on sporting competitions, horse racing, auto racing, etc.

Secondary Symbols.

Players can collect secondary symbols when playing a particular game in exchange for a number of points. For example, when playing a slots game the reels may include secondary symbols ghosted on or adjacent to the primary symbols. If the player receives a winning combination, the player collects the secondary symbol or symbols included in the primary symbols of the winning combination. For example, the player can collect a gold "Car" that he or she can use in a subsequent game feature with a Monopoly® theme.

Jackpots Thresholds.

A player can be notified when progressive jackpots reach a certain player-set threshold in exchange for a number of points. The player can set-up an instant text or email message to be sent when a progressive jackpot has reached a limit set by the player. The receiving devices can be a phone, a personal digital assistant (PDA), an internet mail account, etc. An advantage is that the player can monitor multiple progressive jackpots without worrying that he or she may miss what the player perceives as an optimal opportunity to win a progressive jackpot.

Mystery Bonus Award.

The player is allowed, during a wagering session, to purchase a mystery bonus award in exchange for a number of points. For example, the player buys a mystery bonus award for ten points. After the player buys the award, the mystery bonus award reveals how many points the award was really worth (e.g., 5 points, 10 points, 20 points, etc.).

C. Customization

Optionally, the players can customize games or features of games in exchange for the accumulated points. For example, a player can customize game status and/or game mechanics.

Customize Status.

The player can customize game-related features. The customization features can be received in exchange for one or more points, or, alternatively, as complimentary features. In one example, the player can purchase an additional planet when playing a wagering game with a Star Trek® theme. The additional planet, for example, can increase a player rank (e.g., from Captain to General), status (e.g., from Silver to Gold), or item collection (e.g., from a Solar System to an entire Galaxy).

Customize Game.

The player can customize symbols of a wagering game (similar to the personalization options described above in reference to FIG. 4), such as a reel slot game. Instead of or in addition to standard symbols of the game, the player can select his or her own preferred symbols. The player can select the preferred symbols from a predetermined group of already available symbols or, alternatively, the player can bring their own symbols to the game. For example, the player is provided with the option to select the reel symbols from a group that includes fruit symbols, animal symbols, current event symbols (e.g., World Cup symbols) and car symbols. In another example, the player may input photographic images of close friends or relatives that can replace the standard reel symbols. The player may be charged a standard number of points for the customization option. Alternatively, the player may be charged points based on the level of customization, e.g., more points will provide the player with an enhanced level of customization. Other examples of things that the player can customize are meter font sizes, sounds, audio input (e.g., radio, MP3, etc.), display skins, color schemes, volatility, camera angles (2D to 3D), picture-in-picture options, name, memory storage options, help screen (e.g., you can turn it on/off), anniversary dates, birthdates, base game options, bonus game options, learning mode, tutorial mode, bonus setting background (e.g., Paris, Mars, etc.), tiled pictures, gameplay speed, spin profiles, horoscope display, lucky numbers display, payline configuration, reel size, etc.

D. Game Rule Changes

In alternative embodiments, players can change rules of the game in exchange for points. For example, the players can remove terminators, acquire do-overs, acquire bonus game enhancements, advance levels, participate in off-peak play, etc.

Remove Terminators.

Figure 22:
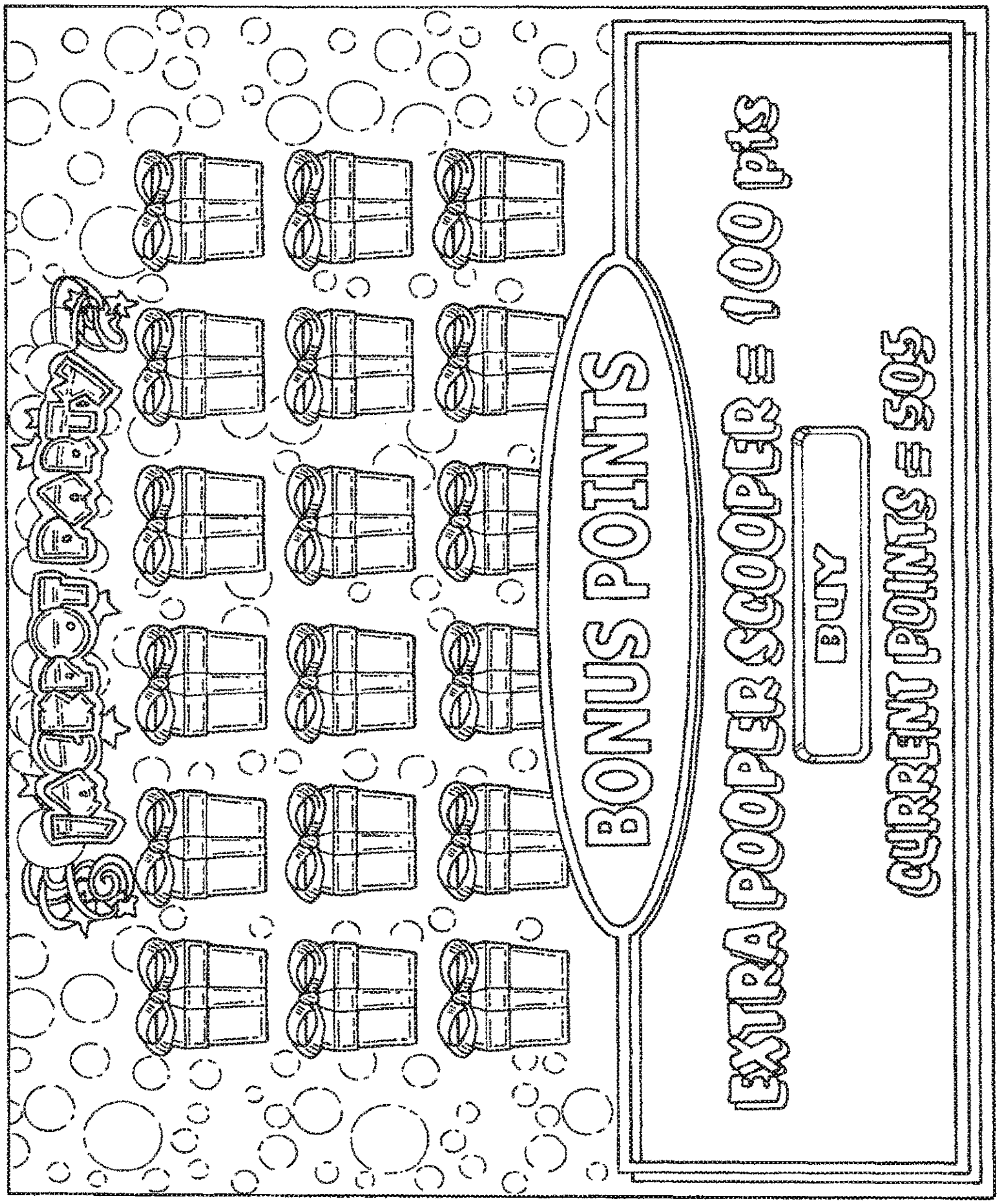
FIG. 22 is an illustration of a bonus screen on the display of the gaming machine in which points are redeemed for a rule change modification, according to another alternative embodiment of the current invention.
Figure 23:
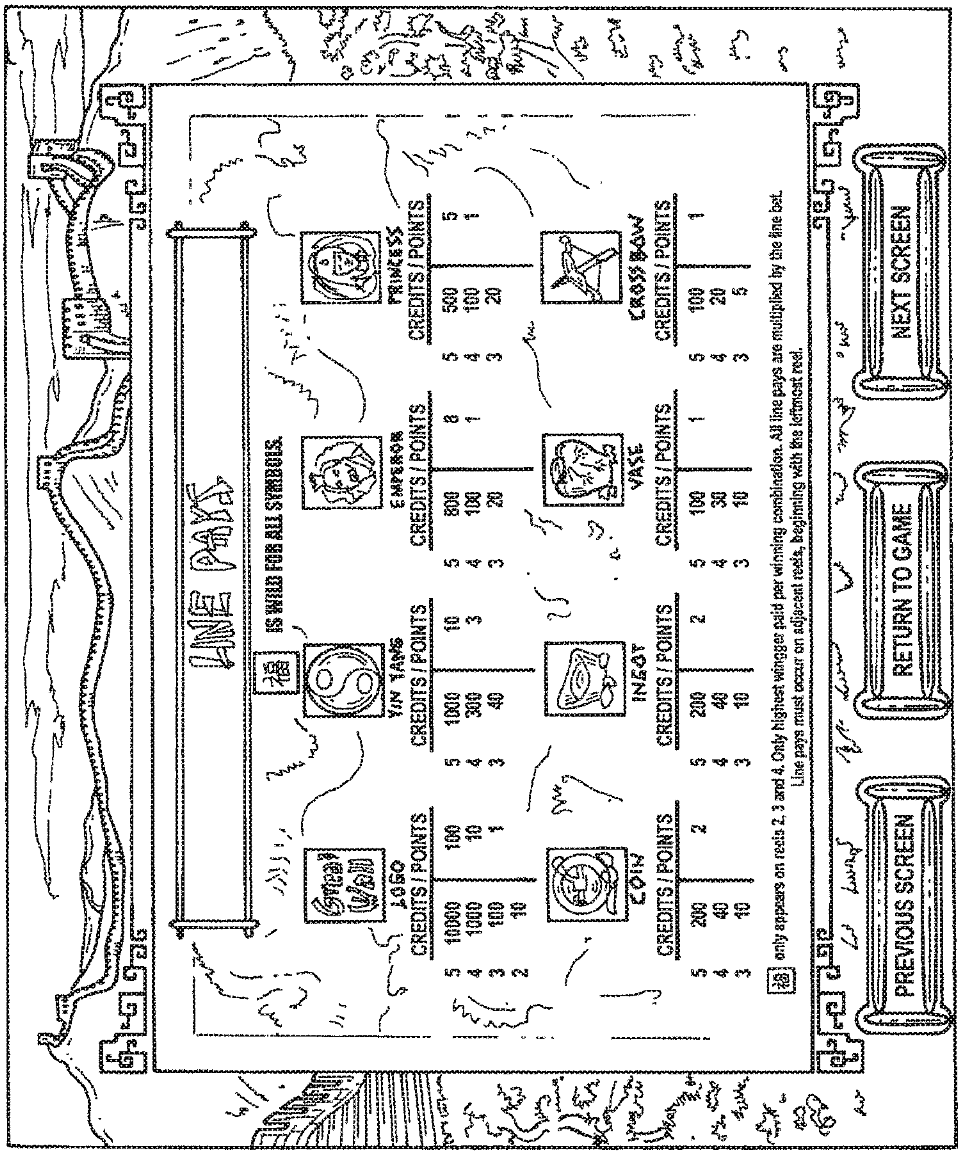
FIG. 23 is an illustration of a credits/points paytable on the display of the gaming machine, according to another alternative embodiment of the current invention.

The player can acquire a symbol that helps to increase the perception of achieving a favorable outcome. In exchange for one or more points, the player can acquire an insurance symbol that prevents a game terminating outcome. For example, the player may purchase a "Pooper Scooper" symbol that removes a "Pooper" symbol, which functions as a game terminating outcome. The "Pooper Scooper" symbol can be selected from an array of player-selectable elements. Referring to FIG. 22, for example, a player can purchase an extra "pooper scooper" in exchange for 100 points.

Do-Over.

One or more points can be exchanged for a second chance, or a do-over, game feature. The player buys the second chance feature that allows the player to continue game-play or to re-play a particular play that has resulted in an unfavorable outcome for the player. For example, if the player is playing a bonus game in which three items of the same kind must be revealed within a limited period of time, the player may want to purchase a second chance feature to extend the period of time. Similarly, if the player is playing a bonus game in which the player must find a hidden treasure, the player may want to purchase a do-over feature if the player has not found the hidden treasure during an initial game session.

Bonus-Game Enhancement.

A bonus game can be changed by the player by purchasing one or more bonus enhancements in exchange for one or more points. The bonus enhancements can include changing the paytable (e.g., changing from a low-pay high-frequency hit to a high-pay low-frequency hit), increasing a number of award-winning symbols, increasing a number of free spins, etc. The player can optionally receive a discount for purchasing a plurality of bonus enhancements.

General Change to Rules of Game.

The rules of the game can be changed (similar to the game feature changes described above in reference to FIGS. 13-15) by the player in exchange for one or more points. The player can purchase game modifiers (e.g., wild symbols, multiplier symbols, keno golden ball multiplier), "can't lose" spins, capability to collect options, "joker pays," extra paylines, extra hands and/or draws in poker, extra pays, volatility switch, expected value (EV) change, etc. Thus, the player can enable a secondary feature in addition to the game that is already being played. For example, the player is playing a base game of slots in which he or she spins reels for achieving randomly selected outcomes. In exchange for ten points, the player enables a "can't lose" spin during the base game of slots in which the player is guaranteed a winning outcome. Similarly, in other examples the player can purchase additional paylines (e.g., increase the number of paylines from ten to twenty) or a double-pay feature (e.g., all pays are double) in exchange for a number of points, or the player can switch the game to be more volatile at higher point levels, etc. In other alternative embodiments, the player can receive a "double" multiplier for each gaming machine if the player receives a "gambler" status. Thus, at least some general changes to rules of the game are offered complimentary at no direct cost to the player.

Level-Advance.

The player can advance to a next level if he or she redeems a required number of points. Thus, the player can "speed" or automatically advance to the next level in exchange for one or more points. For example, the player may advance from a level "ten" to a level "eleven" automatically by trading in ten points. The advance in levels may provide the player with new opportunities, including a new game-play experience, new bonus games, increased status, etc.

Off-Peak Play.

In exchange for one or more points, the player is enticed to return during an off-peak period for a chance to win larger awards. For example, an enticement offer is made for "Double Pay Between 10 a.m.-12 p.m." when the player attempts to cash-out after playing during a peak period. In exchange for one or more points, the player may be guaranteed a reservation at a "Double Pay" gaming machine during the off-peak period. Alternatively, the player may exchange points for viewing enticement announcements. Specifically, the player can use points to obtain "insider" information regarding a chance to win additional and/or larger awards.

III. Point Mechanics

Accumulated points can have various characteristics. As described in more detail in the examples provided below, the points can be (a) maintained according to particular point mechanics and (b) can be used in numerous ways.

A. How to Use Points

The points may have an expiration date, may have their own economy, may be identified in a player profile, may vary based on player status, may be identified in a points menu, and may have a varying exchange rate. The points are preferably part of a value exchange system that is limited to the gaming environment (whether such environment is limited to a physical gaming establishment or additionally extends to other venues such as the Internet and other gaming communities) and is not recognized as a government currency. Earning and redeeming of points, which are units of the exchange system, is limited to participants in the gaming environment.

Expiration Date.

The points accrued by the players can optionally have an expiration date. If the points are not used or, alternatively, renewed by a specific date, after a length of time, or after a number of game-plays, they expire. For example, points awarded in a high-return game may be balanced by an expiration date to encourage the players to use them by or within a specific time period. If a gaming establishment wishes to increase wagering activity on Tuesdays, they can provide a higher point return for points that can be used only on Tuesdays. For example, the player plays a slots game and achieves a winning combination. The player is provided with a choice of 100 anytime points (which can be used on any day of the week) or 500 Tuesdays-only points (which can only be used on Tuesdays). Thus, the gaming establishment is likely to balance the higher point return by the increase of traffic on typically slower wagering days. Optionally, the expiration date of the points can be delayed if the player fulfills a required condition. For example, the expiration time of the points can be increased if the player rents a room from the gaming establishment in which the player conducts the wagering session. In another example, the points never expire as long as the player conducts at least one wagering session in the gaming establishment associated with the player's points.

Token/Currency Economy.

The points can be distributed based on a tiered-point system that acts similar to a currency or token economy. For example, one hundred points are equal to ten silver points, which in turn are equal to a single gold point. As such, the points can be maintained in various categories of points.

Point Profiles and Statistics.

A points profile of the player can be made portable from a gaming machine to another gaming machine. The points profile can include the number of points that the player has accrued as of the current date, and can optionally provide point-related statistics that show the accrued points by date, gaming machine, casino establishment, state, etc. For example, the player can review the number of points that he or she has accrued in California for year 2006. The points profile of the player can be made available on any gaming machine in any gaming establishment that is adapted to recognize the point system. Thus, regardless of whether the player has accrued his or her points in California or Nevada, the points profile is updated from an initial gaming machine to a next gaming machine.

Player's Club.

The player's status, such as Club Status, can affect points. If the player belongs to a player's club (e.g., Elite Poker Club) and the player has achieved a specific status (e.g., VIP status), the player may receive double the points in comparison to a player that has not achieved VIP status and triple the points in comparison to a player that is not a member of the Elite Poker Club. Similarly, the player that has achieved the specific status may also pay less points for specific services, options, or items than other players.

Unique Pop-Up or Menu.

A "PlayerBucks Menu" can be used to provide any information related to points. For example, the menu can show how many points are required to purchase certain options, features, items, services, etc. Also, the menu can show current point leaders, current point winners, current point contests, etc. In another example, referring to FIG. 23, the paytable shows the amount of points and/or credits awarded for particular symbol combinations (e.g., five "Great Wall" symbols pay 10,000 credits and 100 points, and three coin symbols pay ten credits and zero points).

Temporal Exchange Rate.

Optionally, the rate of exchange between points, standard game credits, cash/government currencies, and other items can vary based on specific conditions. For example, one game credit may be equivalent to 10 points during a peak period (e.g., Fridays) and to 5 points during an off-peak period (e.g., Tuesdays). Thus, the player may gain an advantage by converting points to credits or cash on a Tuesday rather than on a Friday. In return, the gaming establishment may gain extra players during the off-peak period.

B. Other Uses for Points

In addition to having various characteristics, the points can be used in numerous ways in addition to those described above. For example, the points can be used in progressive games, can be traded for enhancements, can be traded for credits, can be shared with other players, can be wagered on internet games, and can be won on a recurring basis. The points can be used in any venue, including a casino venue, an online internet venue, and an offline merchandise venue. At a casino venue, the points can be used in a plurality of casino zones. For example, the points can be used in a first casino zone, which includes gaming machines manufactured by manufacturer A, and in a second casino zone, which includes gaming machines manufactured by manufacturer B.

Point Progressives/Special Events.

Points can be used to fund and/or play in a Progressive Points Jackpot or other Special Events. The Progressive Points Jackpot can function similar to a conventional Progressive Jackpot (which awards cash) except that it awards points. The Progressive Points Jackpot can be funded by points, cash, or both. Optionally, the Progressive Points Jackpot can additionally award a cash award. For example, each gaming machine provides two points per game as a contribution to the point progressive jackpot.

Trading Enhancements.

The player can use points to trade a game-play enhancement for another game-play enhancement. The trade can be made between two players or between a player and a gaming machine. For example, a first player may use ten points to trade a wild-game modifier for a free-spin game modifier of a second player. The first player may decide that the wild-game modifier may not be as advantageous to him or her as the free-spin game modifier. Likewise, the second player may decide that the free-spin game modifier is not as advantageous to him or her as the wild-game modifier. Accordingly, each of the two players is happy to trade their own modifier for a modifier that is perceived to be more advantageous.

Trade Points.

The players can trade cash or credits for points. For example, the player can receive 10,000 points instead of $5 credits that have been won on a slots reel spin. Optionally, the 10,000 points can be used only on the specific gaming machine or specific type of gaming machine on which the point have been received (i.e., the player cannot cash out the points or use them on a different gaming machine).

Share/Donate.

Accumulated points can also be shared with other players and can be exchanged according to various rates. The player can share points with relatives, friends, and other players in exchange for one or more points. For example, a first player has accrued 10,000 points. A second player needs 1,000 points to advance to a next game level. For ten points, the first player can transfer 1,000 points to the second player. The first player may transfer the points solely as a charitable act. The ten points that are charged for the point transfer may be paid by either or both of the first player and second player.

Internet Point Games.

Points can be wagered on internet games. While the points may not be exchangeable for money, the points can be wagered from virtually any location that has internet access. Players can increase a "point" value while not truly wagering.

Recurring Points.

Points can be won on a recurring basis. For example, a specific points award may be continuously available regardless of the number of times that the player may have won that specific points award.

Various devices can be used to facilitate maintenance and use of accumulated points, including gaming machines, kiosks, printers, handhelds, big experience machines, big screens, etc. A point kiosk can show, for example, point rankings and scoring, point progressive outcomes, etc. In other examples, the point kiosk can be used to reserve a gaming machine, to find a "hot" gaming machine on the casino floor, to obtain directions to a theme-specific gaming machine (e.g., the location of the nearest wagering game with a Reel 'Em In® theme), to enter a sweepstakes (e.g., the casino can give away $100,000 once a year), to shop for items or services, to print various information (e.g., outcomes, fortune cookies), etc. For example, the point kiosk can be used to check occupancy of a particular gaming machine. A player can check to see if his or her favorite game, e.g., Sky Casino, is available without having to walk to the actual gaming machine.

A handheld device can be used to perform one or more of any function described above. The player can use the handheld device when the player is at the casino or when the player is away from the casino.

Each of these embodiments and obvious variations thereof is contemplated as falling within the spirit and scope of the claimed invention, which is set forth in the following claims.

What is claimed is:

1. A method of operating a gaming system, the gaming system including one or more controllers and a gaming machine, the gaming machine primarily dedicated to playing at least one casino wagering game, the casino wagering game including a base game in which a player input is received and a wagering game outcome is determined, the gaming machine including an electronic display device and one or more electronic input devices, the method comprising:

detecting, via at least one of the one or more electronic input devices, a physical item associated with a monetary value that establishes a credit balance;

initiating the base game of the casino wagering game in response to an input indicative of a wager covered by the credit balance, the base game having an expected value associated therewith;

initiating a secondary game of the base game, the secondary game including a plurality of game episodes, each of the game episodes having predetermined completion criteria capable of being achieved during play of the base game;

in response to achieving the predetermined completion criteria for one of the game episodes during play of the base game, awarding a secondary award that is independent of the expected value of the base game; and receiving, via at least one of the one or more electronic input devices, a cashout input that initiates a payout from the credit balance.

2. The method of claim 1, wherein the casino wagering game further includes at least one bonus game.

3. The method of claim 1, wherein the game episodes are missions having the same expected value.

4. The method of claim 1, wherein one or more of the predetermined completion criteria are displayed on the electronic display device.

5. The method of claim 1, wherein the plurality of game episodes require a progression sequence from a first episode to a second episode.

6. The method of claim 1, wherein the predetermined completion criteria include achieving a special symbol combination.

7. The method of claim 1, wherein the secondary award is a non-monetary award that includes accruing points redeemable for unlocking features during subsequent gameplay.

8. The method of claim 1, wherein the secondary award is a non-monetary award that includes unlocking a new bonus game that is different than a standard bonus game.

9. The method of claim 1, wherein the secondary award is a non-monetary award that includes unlocking a bonus game associated with the base game, the unlocked bonus game being associated with monetary awards.

10. A method of operating a gaming system, the gaming system including one or more controllers and a gaming machine, the gaming machine primarily dedicated to playing at least one casino wagering game, the casino wagering game including a base game in which a player input is received and a wagering game outcome is determined, the gaming machine including an electronic display device and one or more electronic input devices, the method comprising:

detecting, via at least one of the one or more electronic input devices, a physical item associated with a monetary value that establishes a credit balance;

initiating the base game of the casino wagering game in response to an input indicative of a wager covered by the credit balance, the base game having an expected value associated therewith;

initiating a secondary game that is associated with the base game, the secondary game including a plurality of game sequences, each of the game sequences having predetermined completion criteria achievable during play of the base game;

in response to achieving the predetermined completion criteria associated with one of the game sequences, awarding a non-monetary award; and receiving, via at least one of the one or more electronic input devices, a cashout input that initiates a payout from the credit balance.

11. The method of claim 10, wherein the plurality of game sequences are game episodes.

12. The method of claim 10, wherein the non-monetary award includes accruing points redeemable for unlocking features during subsequent gameplay.

13. The method of claim 10, wherein the non-monetary award includes unlocking a new bonus game that is different than a standard bonus game.

14. The method of claim 10, further comprising awarding, in addition to the non-monetary award, a monetary award if a winning outcome of the base game is achieved.

15. The method of claim 10, wherein the predetermined completion criteria includes achieving a special symbol combination.

16. A gaming system comprising:

a gaming machine primarily dedicated to playing at least one casino wagering game, the gaming machine including an electronic display device and one or more electronic input devices; and one or more controllers configured to:

detect, via at least one of the one or more electronic input devices, a physical item associated with a monetary value that establishes a credit balance, initiate the casino wagering game in response to an input indicative of a wager covered by the credit balance, initiate a secondary game of the base game, the secondary game including a plurality of game sequences, each of the game sequences having predetermined completion criteria capable of being achieved during play of the base game, in response to achieving the predetermined completion criteria for one of the game sequences during play of the base game, awarding a secondary award that is independent of the expected value of the base game, and receive, via at least one of the one or more electronic input devices, a cashout input that initiates a payout from the credit balance.

17. The gaming system of claim 16, wherein the secondary award is a non-monetary award that includes accruing points redeemable for unlocking features during subsequent gameplay.

18. The gaming system of claim 16, wherein the secondary award is a non-monetary award that includes unlocking a new bonus game that is different than a standard bonus game.

19. The gaming system of claim 16, wherein the secondary award includes awarding a mixture of credits and points.

20. The gaming system of claim 16, wherein the plurality of game sequences are a plurality of game episodes that require a progression sequence from a first episode to a second episode.

* * * * *